US012602868B2

(12) United States Patent
Gong et al.

(10) Patent No.: US 12,602,868 B2
(45) Date of Patent: Apr. 14, 2026

(54) REMOTE REPRODUCTION METHOD, SYSTEM, AND APPARATUS, DEVICE, MEDIUM, AND PROGRAM PRODUCT

(71) Applicant: Huawei Cloud Computing Technologies Co., Ltd., Gui'an (CN)

(72) Inventors: Weimeng Gong, Gui'an (CN); Jun Li, Beijing (CN); Dandan Tu, Shenzhen (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 144 days.

(21) Appl. No.: 18/358,228

(22) Filed: Jul. 25, 2023

(65) Prior Publication Data

US 2023/0368467 A1    Nov. 16, 2023

Related U.S. Application Data

(63) Continuation of application No. PCT/CN2021/130532, filed on Nov. 15, 2021.

(30) Foreign Application Priority Data

Jan. 26, 2021    (CN) .......................... 202110105037.0

(51) Int. Cl.
*G06T 17/05*        (2011.01)
*G06T 7/246*        (2017.01)
*G06T 13/40*        (2011.01)
(52) U.S. Cl.
CPC .............. *G06T 17/05* (2013.01); *G06T 7/251* (2017.01); *G06T 13/40* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 10,904,488 B1 * | 1/2021 | Weisz .................. | G06V 10/774 |
| 2019/0163431 A1 * | 5/2019 | Rodriguez .............. | G09G 5/12 |
| 2023/0308494 A1 * | 9/2023 | Deliz Centeno ........ | H04L 51/18 |

FOREIGN PATENT DOCUMENTS

| | | |
|---|---|---|
| CN | 110060351 A | 7/2019 |
| CN | 111834021 A | 10/2020 |
| KR | 20200109634 A | 9/2020 |

OTHER PUBLICATIONS

Cheng et al.; "Parametric Human Body Reconstruction Based on Sparse Key Points;" IEEE Transactions on Visualization and Computer Graphics, vol. 22, No. 11, Nov. 2016 (Year: 2016).*

* cited by examiner

*Primary Examiner* — Edward Martello
(74) *Attorney, Agent, or Firm* — Rimon PC

(57) ABSTRACT

This application provides a remote reproduction method, applied to a remote reproduction system, where the system includes a first terminal worn by a first user and a second terminal worn by a second user, and the first user and the second user are located in different geographical locations. According to the method the second terminal obtains an action image of the first user, where the action image of the first user includes a sequence of at least one action formed by a pre-constructed human body model of the first user, and then the second terminal reproduces, for the second user, the action image of the first user at a geographical location in which the second user is located.

21 Claims, 9 Drawing Sheets

First user          Second user          Image of the first user

First user              Second user              Image of the first user

First user                    Second user                    Image of the first user

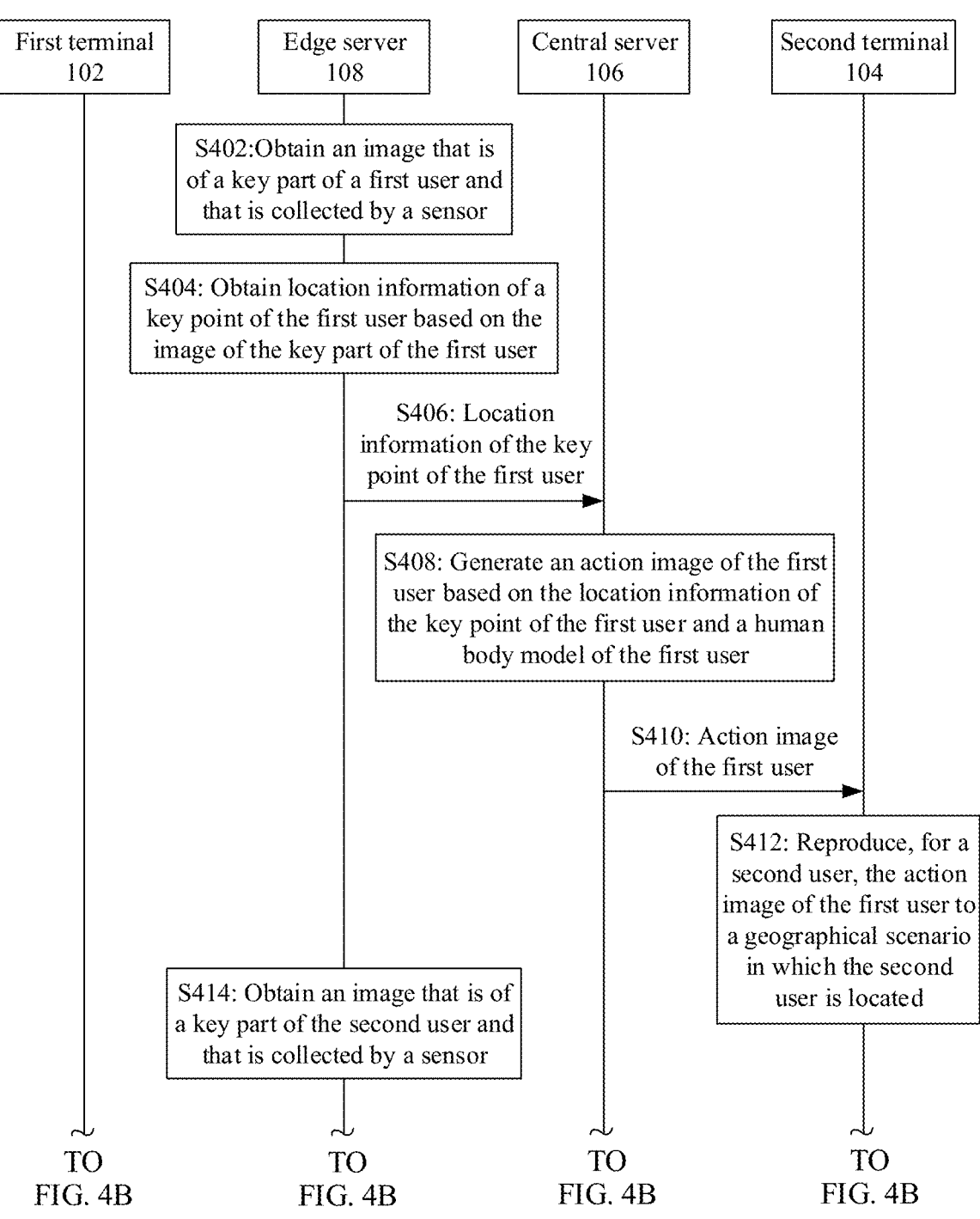

| First terminal 102 | Edge server 108 | Central server 106 | Second terminal 104 |
|---|---|---|---|

S402:Obtain an image that is of a key part of a first user and that is collected by a sensor S404: Obtain location information of a key point of the first user based on the image of the key part of the first user S406: Location information of the key point of the first user S408: Generate an action image of the first user based on the location information of the key point of the first user and a human body model of the first user S410: Action image of the first user S412: Reproduce, for a second user, the action image of the first user to a geographical scenario in which the second user is located S414: Obtain an image that is of a key part of the second user and that is collected by a sensor

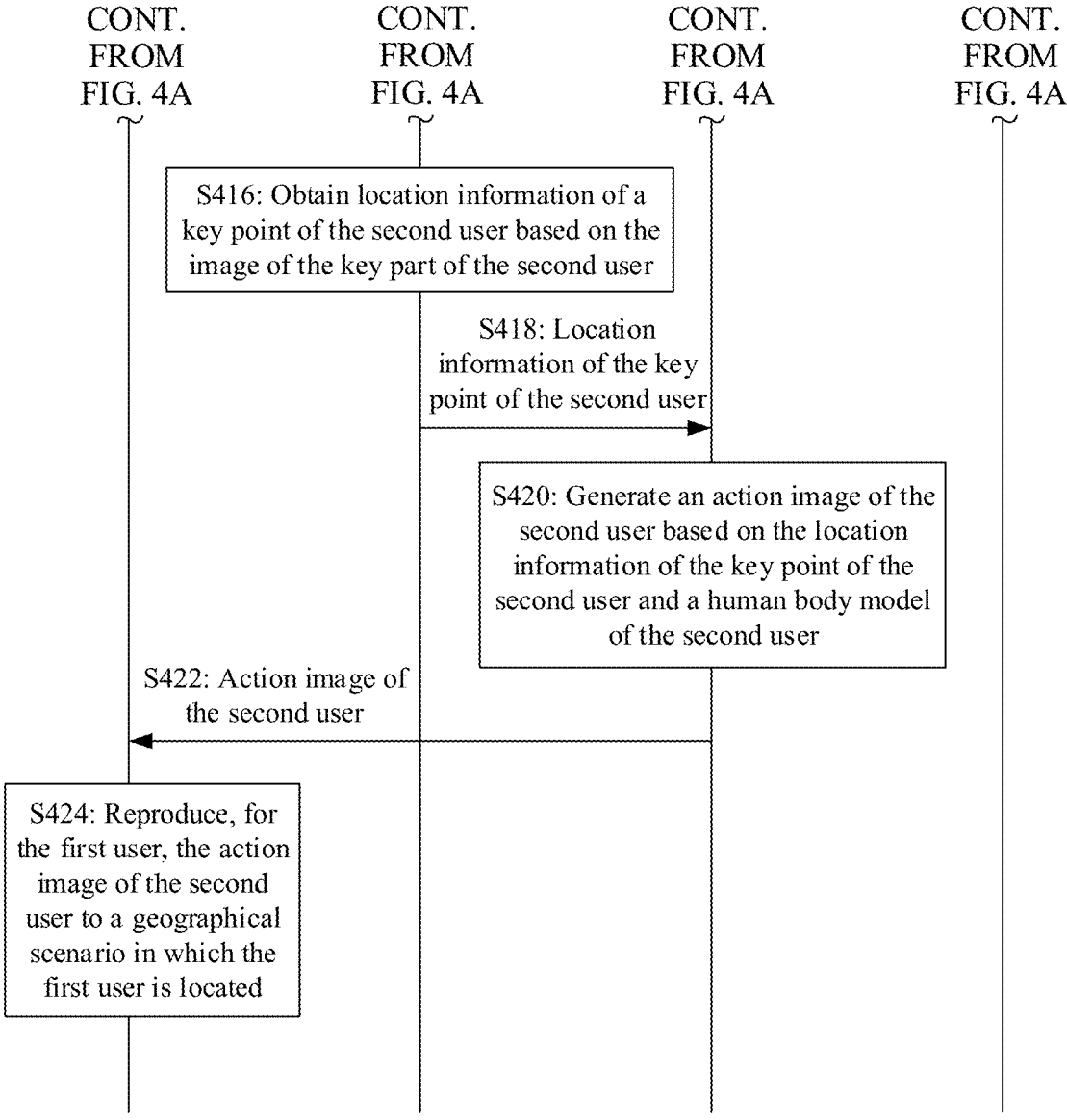

CONT. FROM FIG. 4A    CONT. FROM FIG. 4A    CONT. FROM FIG. 4A    CONT. FROM FIG. 4A

S416: Obtain location information of a key point of the second user based on the image of the key part of the second user S418: Location information of the key point of the second user S420: Generate an action image of the second user based on the location information of the key point of the second user and a human body model of the second user S422: Action image of the second user S424: Reproduce, for the first user, the action image of the second user to a geographical scenario in which the first user is located

FIG. 4B

REMOTE REPRODUCTION METHOD, SYSTEM, AND APPARATUS, DEVICE, MEDIUM, AND PROGRAM PRODUCT

CROSS-REFERENCE TO RELATED APPLICATIONS

This application is a continuation of International Application No. PCT/CN2021/130532, filed on Nov. 15, 2021, which claims priority to Chinese Patent Application No. 202110105037.0, filed on Jan. 26, 2021. The disclosures of the aforementioned applications are hereby incorporated by reference in their entireties.

TECHNICAL FIELD

This application relates to the field of computer technologies, and in particular, to a remote reproduction method, system, and apparatus, a device, a computer-readable storage medium, and a computer program product.

BACKGROUND

In many application scenarios, due to geographical limitations, it is difficult for people to communicate face to face with each other about a same scenario or event. Real face-to-face communication is costly and inefficient. With the continuous development of computer and communication technologies, it is possible to reproduce an image of the other party remotely, to achieve an effect like face-to-face communication.

A typical application scenario for remote image reproduction is in remote assistance. Remote assistance means that an assistant assists an assisted party through remote communication, to resolve a problem that the assisted party encountered. For example, in a device maintenance scenario, experts with diagnosis or maintenance capabilities guide device operators at a fault site by using remote communication. Currently, the industry provides a holographic capture and reproduction solution to reproduce an image of the remote assistant on the fault site, thereby providing a more natural interaction.

However, in the foregoing solution, a three-dimensional human body is usually reconstructed in real time by using multi-angle images. An ideal human body model usually requires several hours of computation. Therefore, a real-time reconstruction effect is usually poor, and it is difficult to meet a service requirement. In addition, real-time transmission of multi-angle images to a cloud or a terminal for remote reconstruction occupies a large quantity of network resources. When the network quality is poor, problems such as frame loss and frame freezing may occur, affecting the interaction experience.

SUMMARY

This application provides a remote reproduction method. In the method, a realistic human body model is pre-constructed in a preparation phase, and then an action image is generated by using the pre-constructed human body model in a remote reproduction phase, to reproduce the action image for a user, so as to achieve an effect like face-to-face communication. In this way, the problem of not meeting a service requirement due to a poor model reconstruction effect is resolved, a multi-angle image does not need to be transmitted in real time, and less network resources are occupied, thereby avoiding frame loss and frame freezing when the network quality is poor, therefore improving the interaction experience. This application further provides a system and an apparatus corresponding to the foregoing method, a device, a computer-readable storage medium, and a computer program product.

According to a first aspect, this application provides a remote reproduction method. The method may be executed by a remote reproduction system, where the remote reproduction system includes a first terminal and a second terminal, the first terminal is worn by a first user, the second terminal is worn by a second user, and the first user and the second user are located in different geographical locations.

Specifically, the second terminal may obtain an action image of the first user, where the action image of the first user includes a sequence of at least one action formed by a human body model of the first user, the human body model of the first user is a pre-constructed model, and the second terminal reproduces, for the second user, the action image of the first user at a geographical location in which the second user is located.

The human body model of the first user is pre-constructed in a preparation phase, and the action image is directly generated by using the human body model in a remote reproduction phase. This avoids a large amount of time spent in constructing a human body model during remote reproduction, and meets a real-time requirement of remote reproduction application, so that a relatively large amount of time can be spent in the preparation phase to reconstruct a realistic human body model, thereby achieving a relatively good effect, and meeting service requirements. In addition, in the remote reproduction phase, a large number of images do not need to be sent to a cloud or a terminal to reconstruct a human body model in real time. In this way, a large number of network resources do not need to be occupied by large-scale data transmission while frame loss and frame freezing are avoided when the network quality is poor, thereby improving the interaction experience.

In some possible implementations, the remote reproduction system may further include a server. The remote reproduction system may generate the action image of the first user by using the computing power of the server. Specifically, the server obtains location information of a key point of the first user. The server may determine a movement track of the key point of the first user based on the location information of the key point of the first user. Then, the server may obtain the action image of the first user based on the movement track and the human body model of the first user that is stored in the server. The server sends the action image of the first user to the second terminal.

The movement track of the key point may be represented as a location sequence of the key point. The key point of the first user is bound to the human body model of the first user. The server may determine, based on the location sequence of the key point, a human body model corresponding to each location. A consecutive human body model can be formed based on the human body models corresponding to the locations, to generate the action image of the first user. The action image of the first user includes a sequence of at least one action formed by the human body model of the user.

Because the image generation process consumes a large amount of computing power, it is executed on a server side, and therefore the second terminal only needs to receive the action image of the first user to present, for the second user, the action image of the first user to the geographical location in which the second user is located. In this way, a requirement on the second terminal is reduced, and a lightweight second terminal may also be used to implement the remote reproduction method, and has a relatively high availability.

In some possible implementations, the remote reproduction system may include a server in a cloud, for example, a central server in a central cloud and an edge server in an edge cloud. The edge server and the central server may collaboratively generate an action image. Specifically; the edge server may obtain the location information of the key point of the first user, for example, by performing key point detection by using an image of a key part of the first user that is collected by an image sensor, to obtain location information of a corresponding key point. The central server determines the movement track of the key point of the first user based on the location information of the key point that is obtained by the edge server, to obtain the action image of the first user based on the movement track and the human body model of the first user that is stored in the central server.

Because only the location information of the key point is transmitted between the edge cloud server and the central cloud server, and a large amount of image data does not need to be transmitted, less network resources are used, and problems such as frame loss and frame freezing when the network quality is poor are avoided.

In some possible implementations, the server may obtain the image of the key part of the first user, and then obtain location information of a corresponding key point based on the image of the key part of the first user. Specifically, the server may process the image of the key part of the first user by using a key point detection technology, to obtain the location information of the key point of the first user. For example, the server may construct a key point detection model, input the image of the key part of the first user into the key point detection model, and extract a key point from the image by using the key point detection model, to obtain the location information of the key point of the first user.

The key point detection model may be a conventional key point detection model. The conventional key point detection model includes a key point detection model based on template matching, for example, a pictorial structure model. The key point detection model may alternatively be a neural network-based key point detection model. The neural network-based key point detection model includes but is not limited to a cascaded feature network model, a regional multi-person pose estimation model, a mask region convolutional neural network model, a cascaded pyramid network model, and the like.

The method uses the key point detection model to detect the image and obtain the location information of the key point, which reduces a type and quantity of the sensors in the remote reproduction system, and reduces the complexity of the remote reproduction system.

In some possible embodiments, the server may obtain, from a pose sensor such as an inertial measurement unit deployed at the key part of the first user, location information of a key point corresponding to the key part. Because detection does not need to be performed by using a complex model, obtaining the location information of the key point is more efficient, thereby improving the efficiency of remote reproduction.

In a possible implementation, the first terminal may further obtain an image of the geographical location in which the second user is located, and reproduces, for the first user, the image of the geographical location in which the second user is located at a geographical location in which the first user is located. In this way, the first user may remotely assist, based on the image of the geographical location in which the second user is located, the second user in resolving a problem in the geographical location in which the second user is located, for example, a problem on a fault site.

In some possible implementations, the first terminal is a virtual reality terminal, and the second terminal is an augmented reality terminal. The augmented reality terminal may superimpose an onsite image and an image of the first user for presentation, thereby improving an immersive feeling.

In some possible implementations, the first terminal may obtain an action image of the second user, where the action image of the second user includes a sequence of at least one action formed by a human body model of the second user, and the human body model of the second user is a pre-constructed model, and the first terminal reproduces, for the first user, the action image of the second user to the geographical location in which the first user is located. In this way, the first user may perform targeted correction on the first user based on the action image of the second user, thereby improving online learning efficiency.

In some possible implementations, the first terminal and the second terminal are virtual reality terminals. In a scenario such as online learning, a virtual reality terminal is used to virtualize a real environment, so that interaction can be improved.

In some possible implementations, when a computing capability of the first terminal is strong enough, for example, the first terminal can support the generation of an action image based on a human body model, the action image may not be generated by using the cloud computing capability: Instead, the first terminal directly generates the action image of the first user locally based on the pre-constructed human body model of the first user, and then delivers the action image of the first user to the second terminal.

Specifically, the first terminal obtains location information of a key point of the first user. Then, the first terminal determines a movement track of the key point of the first user based on the location information of the key point of the first user, and obtains the action image of the first user based on the movement track and the human body model of the first user that is stored in the first terminal.

Because the action image does not need to be forwarded by a server, the cost of the remote reproduction system can be reduced, and delays are reduced.

In some possible implementations, the human body model is a three-dimensional human body model, and the action image is a three-dimensional action image. The three-dimensional action image may vividly reproduce an image of the first user, and provide a better immersive experience for the second user. In some embodiments, the human body model may alternatively be a two-dimensional human body model, and the rendering efficiency of the two-dimensional human body model is relatively high. In this way, the second user can more timely view the action image of the first user, thereby reducing the delay.

In some possible implementations, the action image may be used in a scenario such as remote assistance (for example, troubleshooting) or online learning, to provide an effect similar to face-to-face communication for a user.

According to a second aspect, this application provides a remote reproduction system. The system includes a first terminal and a second terminal, the first terminal is worn by a first user, the second terminal is worn by a second user, and the first user and the second user are located in different geographical locations.

The second terminal is configured to: obtain an action image of the first user, and reproduce, for the second user, the action image of the first user at a geographical location in which the second user is located, where the action image of the first user includes a sequence of at least one action formed by a human body model of the first user, and the human body model of the first user is a pre-constructed model.

In some possible implementations, the remote reproduction system further includes a server.

The server is configured to: obtain location information of a key point of the first user, determine a movement track of the key point of the first user based on the location information of the key point of the first user, and obtain the action image of the first user based on the movement track and a human body model of the first user stored in the server. The server is further configured to send the action image of the first user to the second terminal.

In a possible implementation, the server is specifically configured to:

obtain an image of a key part of the first user, and obtain location information of a corresponding key point based on the image of the key part of the first user.

In some possible implementations, the server is specifically configured to:

obtain, from a pose sensor deployed at a key part of the first user, location information of a key point corresponding to the key part.

In some possible implementations, the first terminal is configured to:

obtain an image of the geographical location in which the second user is located; and reproduce, for the first user, the image of the geographical location in which the second user is located at a geographical location in which the first user is located.

In some possible implementations, the first terminal is a virtual reality terminal, and the second terminal is an augmented reality terminal.

In some possible implementations, the first terminal is configured to:

obtain an action image of the second user, where the action image of the second user includes a sequence of at least one action formed by a human body model of the second user, and the human body model of the second user is a pre-constructed model; and reproduce, for the first user, the action image of the second user at a geographical location in which the first user is located.

In some possible implementations, the first terminal and the second terminal are virtual reality terminals.

In some possible implementations, the first terminal is configured to:

obtain location information of a key point of the first user;

determine a movement track of the key point of the first user based on the location information of the key point of the first user; and obtain the action image of the first user based on the movement track and the human body model of the first user that is stored in the first terminal.

In some possible implementations, the human body model is a three-dimensional human body model, and the action image is a three-dimensional action image.

According to a third aspect, an embodiment of this application provides a remote reproduction apparatus. The remote reproduction apparatus is deployed in a second terminal, the second terminal is worn by a second user, the second user and a first user are located in different geographical locations, and the apparatus includes:

an image obtaining unit, configured to obtain an action image of the first user, where the action image of the first user includes a sequence of at least one action formed by a human body model of the first user, and the human body model of the first user is a pre-constructed model; and an image reproduction unit, configured to reproduce, for the second user, the action image of the first user at a geographical location in which the second user is located.

In some possible implementations, the apparatus further includes:

an image sending unit, configured to send an action image of the second user to the first terminal, where the action image of the second user includes a sequence of at least one action formed by a human body model of the second user, and the human body model of the second user is a pre-constructed model.

In some possible implementations, the apparatus further includes:

an image generation unit, configured to: obtain location information of a key point of the second user, determine a movement track of the key point of the second user based on the location information of the key point of the second user, and obtain the action image of the second user based on the movement track and a human body model of the second user that is stored in the second terminal.

In some possible implementations, the image generation unit is specifically configured to:

obtain an image of a key part of the second user, and obtain location information of a corresponding key point based on the image of the key part of the second user.

In some possible implementations, the image generation unit is specifically configured to:

obtain, from a pose sensor deployed at a key part of the second user, location information of a key point corresponding to the key part.

In some possible implementations, the apparatus further includes:

an image sending unit, configured to send, to the first terminal, an image of the geographical location in which the second user is located.

In some possible implementations, the image obtaining unit is specifically configured to:

obtain the action image of the first user from a server or the first terminal.

In some possible implementations, the human body model is a three-dimensional human body model, and the action image is a three-dimensional action image.

According to a fourth aspect, an embodiment of this application provides a remote reproduction apparatus. The remote reproduction apparatus is deployed in a server, and the apparatus includes:

a location obtaining unit, configured to obtain location information of a key point of a first user;

a track determining unit, configured to determine a movement track of the key point of the first user based on the location information of the key point of the first user;

an image generation unit, configured to obtain an action image of the first user based on the movement track and a human body model of the first user that is stored in the server, where the action image of the first user includes a sequence of at least one action formed by the human body model of the first user, and the human body model of the first user is a pre-constructed model; and an image sending unit, configured to send the action image of the first user to a second terminal, so that the second terminal reproduces, for the second user, the action image of the first user at a geographical location in which the second user is located, where the first user and the second user are located in different geographical locations.

In some possible implementations, the location obtaining unit is specifically configured to:

obtain an image of a key part of the first user, and obtain location information of a corresponding key point based on the image of the key part of the first user.

In some possible implementations, the location obtaining unit is specifically configured to:

obtain, from a pose sensor deployed at a key part of the first user, location information of a key point corresponding to the key part.

In some possible implementations, the location obtaining unit is further configured to:

obtain location information of a key point of the second user.

The track determining unit is further configured to:

determine a movement track of the key point of the second user based on the location information of the key point of the second user.

The image generation unit is further configured to:

obtain an action image of the second user based on the movement track and a human body model of the second user that is stored in the server, where the action image of the second user includes a sequence of at least one action formed by the human body model of the second user, and the human body model of the second user is a pre-constructed model.

The image sending unit is further configured to:

send the action image of the second user to the first terminal, so that the first terminal reproduces, for the first user, the action image of the second user at a geographical location in which the first user is located.

In some possible implementations, the image generation unit is further configured to:

generate an image of the geographical location in which the second user is located.

The image sending unit is further configured to:

send the image of the geographical location in which the second user is located to the first terminal.

According to a fifth aspect, an embodiment of this application provides a remote reproduction apparatus. The remote reproduction apparatus is deployed in a first terminal, the first terminal is worn by a first user, the first user and a second user are located in different geographical locations, and the apparatus includes:

an image obtaining unit, configured to obtain an image of a geographical location in which the second user is located and/or an action image of the second user, where the action image of the second user includes a sequence of at least one action formed by a human body model of the second user, and the human body model of the second user is a pre-constructed model; and an image reproduction unit, configured to reproduce, for the first user, the image of the geographical location in which the second user is located and/or the action image of the second user at a geographical location in which the first user is located.

In some possible implementations, the apparatus further includes:

an image sending unit, configured to send an action image of the first user to the second terminal, where the action image of the first user includes a sequence of at least one action formed by a human body model of the first user, and the human body model of the first user is a pre-constructed model.

In some possible implementations, the apparatus further includes:

an image generation unit, configured to: obtain location information of a key point of the first user, determine a movement track of the key point of the first user based on the location information of the key point of the first user, and obtain the action image of the first user based on the movement track and the human body model of the first user that is stored in the first terminal.

In some possible implementations, the image generation unit is specifically configured to:

obtain an image of a key part of the first user, and obtain location information of a corresponding key point based on the image of the key part of the first user.

In some possible implementations, the image generation unit is specifically configured to:

obtain, from a pose sensor deployed at a key part of the first user, location information of a key point corresponding to the key part.

In some possible implementations, the apparatus further includes:

an image sending unit, configured to send, to the second terminal, an image of the geographical location in which the first user is located.

In some possible implementations, the image obtaining unit is specifically configured to:

obtain the action image of the second user from a server or the second terminal.

In some possible implementations, the human body model is a three-dimensional human body model, and the action image is a three-dimensional action image.

According to a sixth aspect, this application provides a second terminal. The second terminal includes a processor and a memory: The processor and the memory communicate with each other. The processor is configured to execute instructions stored in the memory, so that the second terminal implements a function of the remote reproduction apparatus according to the third aspect.

According to a seventh aspect, this application provides a server. The server includes a processor and a memory. The processor and the memory communicate with each other. The processor is configured to execute instructions stored in the memory, so that the server implements a function of the remote reproduction apparatus according to the fourth aspect.

According to an eighth aspect, this application provides a first terminal. The first terminal includes a processor and a memory: The processor and the memory communicate with each other. The processor is configured to execute instructions stored in the memory, so that the first terminal implements a function of the remote reproduction apparatus according to the fifth aspect.

According to a ninth aspect, this application provides a computer-readable storage medium, where the computer-readable storage medium stores instructions, and the instructions instruct a second terminal to perform steps performed by the second terminal in the remote reproduction method according to the first aspect or any one of the implementations of the first aspect.

According to a tenth aspect, this application provides a computer-readable storage medium, where the computer-readable storage medium stores instructions, and the instructions instruct a server to perform steps performed by the server in the remote reproduction method according to the first aspect or any one of the implementations of the first aspect.

According to an eleventh aspect, this application provides a computer-readable storage medium, where the computer-readable storage medium stores instructions, and the instructions instruct a first terminal to perform steps performed by the first terminal in the remote reproduction method according to the first aspect or any one of the implementations of the first aspect.

According to a twelfth aspect, this application provides a computer program product including instructions, and when the computer program product runs on a second terminal, the second terminal is enabled to perform steps performed by the second terminal in the remote reproduction method according to the first aspect or any one of the implementations of the first aspect.

According to a thirteenth aspect, this application provides a computer program product including instructions, and when the computer program product runs on a server, the server is enabled to perform steps performed by the server in the remote reproduction method according to the first aspect or any one of the implementations of the first aspect.

According to a fourteenth aspect, this application provides a computer program product including instructions, and when the computer program product runs on a first terminal, the first terminal is enabled to perform steps performed by the first terminal in the remote reproduction method according to the first aspect or any one of the implementations of the first aspect.

In this application, based on the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings used in describing embodiments.

FIG. 4A and FIG. 4B are a flowchart of a remote reproduction method according to an embodiment of this application:

DESCRIPTION OF EMBODIMENTS

Figure 1:
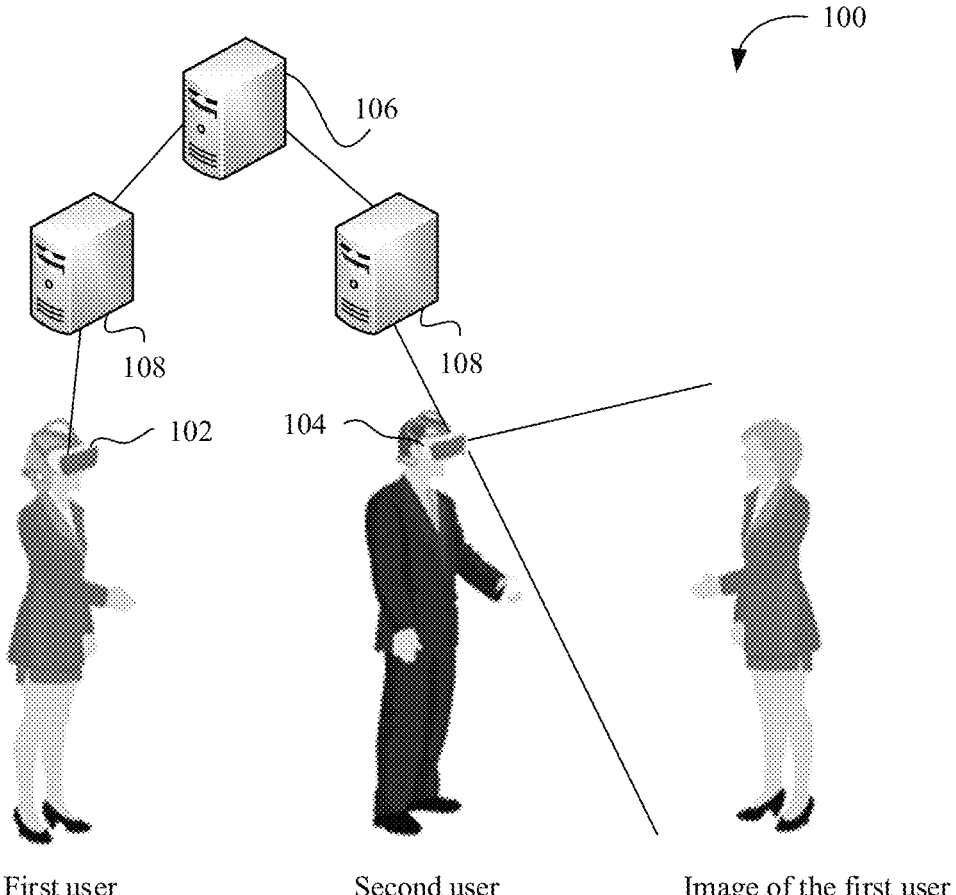
FIG. 1 is a schematic diagram of a system architecture of a remote reproduction system according to an embodiment of this application.

The terms "first" and "second" in embodiments of this application are merely intended for differentiation, and shall not be understood as an indication or implication of relative importance or implicit indication of a quantity of indicated technical features. Therefore, a feature limited by "first" or "second" may explicitly or implicitly include one or more features.

Some technical terms used in embodiments of this application are first described.

Remote reproduction means to reproduce an image by using a remote communication technology between separate geographical locations, so that people in different geographical locations can communicate with each other about a common scenario or event, and achieve an effect like face-to-face communication. The reproduced image may be an image of a person, or an image of a geographical location in which a person is located.

Remote reproduction can be used in different scenarios in a plurality of domains. For example, remote reproduction may be used in a remote assistance scenario or an online learning scenario. The remote assistance scenario is a scenario in which an assistant assists an assisted person through remote communication, to resolve a problem that the assisted person has encountered. For example, in the remote assistance scenario, the assistant may be an expert with diagnosis or maintenance capabilities, and the assisted person may be an operator located at a fault site. The expert can remotely communicate with the operator located at the fault site to troubleshoot the fault. For another example, in the online learning scenario, teachers or trainers may instruct students or trainees to learn online through remote communication.

For communication between people in different geographical locations, the industry provides a holographic capture and reproduction-based remote reproduction solution. Using the solution can reproduce an image of a person at the site, thereby providing a more natural interaction experience.

The holographic capture and reproduction-based remote reproduction solution is specifically as follows: Synchronous cameras deployed in different directions simultaneously capture an object whose image is to be reproduced, for example, an assistant is captured, to obtain a multi-angle image of the assistant, and a three-dimensional human body may be reconstructed in real time based on the multi-angle image, to obtain a three-dimensional human body model. An augmented reality (AR) device of the assisted person, for example, AR glasses, establishes a coordinate system based on an observation location of the assisted person, places the reconstructed three-dimensional human body model in the coordinate system, and then renders the reconstructed three-dimensional human body model into a binocular video. The AR glasses present the binocular video to the assisted person, so that the image of the assistant is reproduced at the site.

However, ideal three-dimensional human body reconstruction usually requires several hours of computation. However, remote reproduction application has very high for real-time performance requirements, the effect of a human body model reconstructed in real time is relatively poor, and it is difficult to meet a service requirement. In addition, the real-time transmission of multi-angle images to a cloud or a terminal for remote reconstruction can occupy a large quantity of network resources. In addition, when the network quality is poor, problems such as frame loss and frame freezing may occur, affecting the interaction experience.

In view of this, an embodiment of this application provides a remote reproduction method. The method is executed by a remote reproduction system. The remote reproduction system includes a first terminal and a second terminal. The first terminal is worn by a first user, and the second terminal is worn by a second user. The first user and the second user are participants in a communication process. In a remote assistance scenario, the first user may be an assistant, for example, an expert having a diagnosis or maintenance capability, and the second user may be an assisted person, for example, an operator at a fault site. In an online learning scenario, the first user may be a teacher or a trainer, and the second user may be a student, a trainee, or the like.

Specifically, the second terminal may obtain an action image of the first user, where the action image of the first user includes a sequence of at least one action formed by a human body model of the first user, the human body model of the first user is a pre-constructed model, and the second terminal reproduces, for the second user, the action image of the first user at a geographical location in which the second user is located.

In the method, a remote reproduction process is divided into two phases: a preparation phase before remote reproduction starts and a remote reproduction phase. The human body model of the first user is pre-constructed in the preparation phase, and the action image is directly generated by using the human body model in the remote reproduction phase. This avoids a large amount of time spent in constructing a human body model during remote reproduction, and meets a real-time requirement of remote reproduction applications, so that a relatively large amount of time can be spent in the preparation phase to reconstruct a realistic human body model, thereby achieving a relatively good effect, and meeting the service requirements. In addition, in the remote reproduction phase, a large number of images do not need to be sent to a cloud or a terminal to reconstruct a human body model in real time. In this way, a large number of network resources do not need to be occupied by large-scale data transmission while frame loss and frame freezing are avoided when the network quality is poor, thereby improving the interaction experience.

The remote reproduction method provided in embodiments of this application may be applied to different scenarios. In some embodiments, the remote reproduction method may be applied to a remote assistance scenario, so that experts having diagnosis or maintenance capabilities remotely assist operators at a fault site in troubleshooting and/or fault rectification. In some other embodiments, the remote reproduction method may be applied to an online learning scenario, for example, a scenario such as online fitness learning or online experimental course learning, allowing teachers or trainers to remotely teach students or trainees.

For details, refer to a schematic diagram of a system architecture of a remote reproduction system 100 shown in FIG. 1. The remote reproduction system 100 includes a first terminal 102 and a second terminal 104. The first terminal 102 is worn by a first user, the second terminal 104 is worn by a second user, and the first user and the second user are located in different geographical locations.

The second terminal 104 is specifically configured to obtain an action image of the first user, and reproduce, for the second user, the action image of the first user at a geographical location in which the second user is located, where the action image of the first user includes a sequence of at least one action formed by a human body model of the first user, and the human body model of the first user is a pre-constructed model.

In some possible implementations, the first terminal 102 is specifically configured to obtain an image of the geographical location in which the second user is located, or obtain an action image of the second user, and reproduce, for the first user, the image of the geographical location in which the second user is located at a geographical location in which the first user is located, or reproduce, for the first user, the action image of the second user at a geographical location in which the first user is located, where the action image of the second user includes a sequence of at least one action formed by a human body model of the second user, and the human body model of the second user is a pre-constructed human body model.

In a situation where the first terminal 102 and the second terminal 104 are lightweight terminals having weak computing capabilities insufficient to support the generation of an action image based on a human body model or the generation of an image of a geographical location, the remote reproduction system 100 may further generate an action image by using a cloud computing capability. Specifically, a cloud computing device such as a central server may generate the action image of the first user based on the human body model of the first user, and then deliver the action image of the first user to the second terminal 104.

Specifically, refer to the schematic diagram of the system architecture of the remote reproduction system 100 shown in FIG. 1. The remote reproduction system 100 may further include a central server 106 in a cloud environment. The central server 106 may generate the action image of the first user based on the pre-constructed human body model of the first user, and then send the action image of the first user to the second terminal 104. The second terminal 104 presents, for the second user, the action image of the first user at the geographical location in which the second user is located.

Further, the remote reproduction system 100 may further include an edge server 108 in an edge environment. The edge server 108 may obtain location information of a key point of the first user. The key point is a point representing a user action, and includes but is not limited to a facial key point such as a pupil, an eyebrow; or a mouth corner, or a body joint such as a knuckle, an elbow, or a knee. Correspondingly, the central server 106 generates the action image of the first user based on the location information of the key point of the first user and the human body model of the first user. In this way, sending a large quantity of images to the cloud can be avoided, which saves network and computing resources, and avoids problems that may seriously affect image quality: such as frame loss and frame freezing, caused by large-scale data transmission when the network quality is poor.

It should be noted that the step of obtaining the location information of the key point of the first user may alternatively be performed by the central server 106, or may be performed by the first terminal 102. This is not limited in embodiments of this application.

In some possible implementations, when a computing capability of the first terminal 102 is sufficiently strong, for example, the first terminal 102 can support the generation of an action image based on a human body model, the action image may not be generated by using the cloud computing capability. Instead, the first terminal 102 directly generates the action image of the first user locally based on the pre-constructed human body model of the first user, and then delivers the action image of the first user to the second terminal 104.

Figure 2:
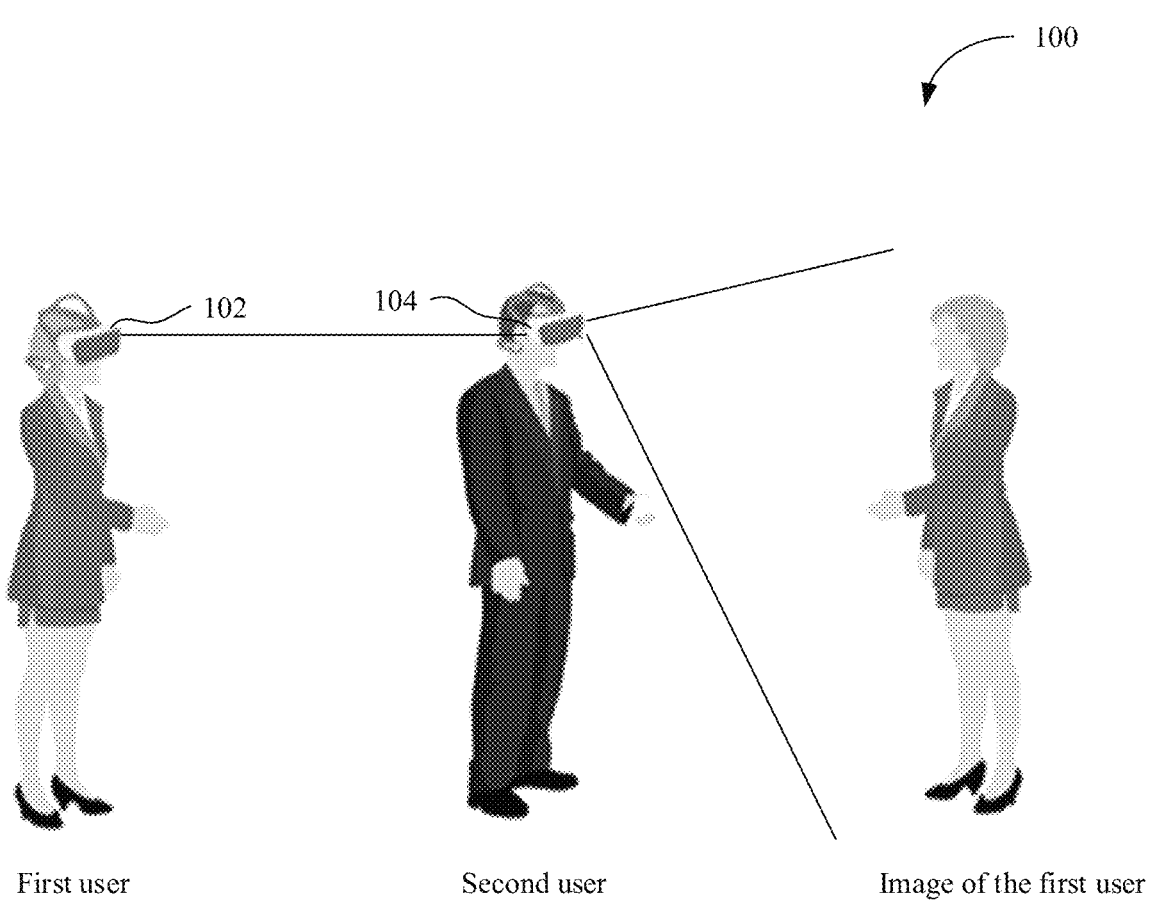
FIG. 2 is a schematic diagram of a system architecture of another remote reproduction system according to an embodiment of this application.

Refer to a schematic diagram of a system architecture of a remote reproduction system 100 shown in FIG. 2. As shown in FIG. 2, the remote reproduction system 100 includes a first terminal 102 and a second terminal 104. The first terminal 102 may generate an action image of a first user based on a pre-constructed human body model of the first user, and then the first terminal 102 may deliver the action image of the first user to the second terminal 104 through wired communication (for example, optical fiber communication or coaxial cable communication) or wireless communication (for example, a 5th generation mobile network (5G) or a wireless hotspot (Wi-Fi)). The second terminal 104 may present, for the second user, the action image of the first user at a geographical location in which the second user is located.

In some possible implementations, the second terminal 104 may also generate an action image of the second user based on a pre-constructed human body model of the second user, and then send the action image of the second user to the first terminal 102 through wireless communication such as 5G. The first terminal 102 may present, for the first user, the action image of the second user at a geographical location in which the first user is located. In some embodiments, the second terminal 104 may also generate an image of the geographical location in which the second user is located, and then send the image of the geographical location in which the second user is located to the first terminal 102. The first terminal 102 may present, to the first user, the image of the geographical location in which the second user is located at the geographical location in which the first user is located.

The remote reproduction method provided in this embodiment of this application depends on a human body model pre-constructed in a preparation phase. To make the technical solutions of this application clearer and easier to understand, embodiments of this application further describe in detail a process of constructing a human body model in the preparation phase.

Figure 3:
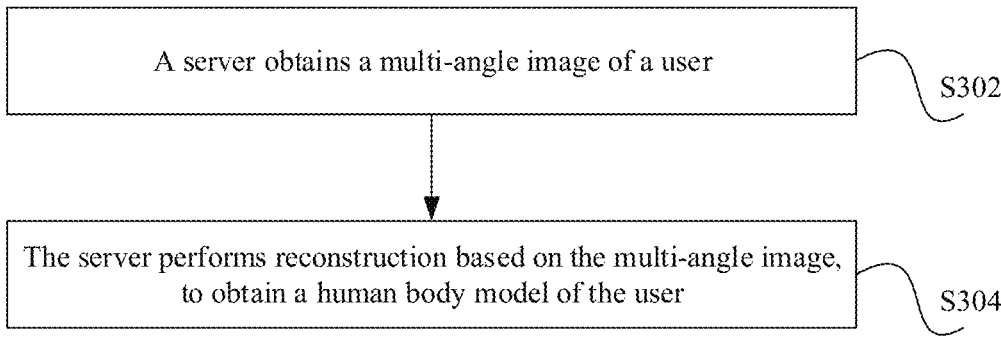
FIG. 3 is a flowchart of a method of constructing a human body model according to an embodiment of this application.

Refer to a flowchart of a human body model construction method shown in FIG. 3. The method includes the following steps.

S302: A server obtains a multi-angle image of a user.

Specifically, for the first user or the second user, a sensor, for example, an infrared camera, may be deployed in a terminal (for example, the first terminal 102 or the second terminal 104) worn by the user or may be deployed at a geographical location in which the user is located. The server may obtain images of different angles of view of the user from the sensor, for example, the infrared camera, to obtain the multi-angle image of the user.

S304: The server performs reconstruction based on the multi-angle image to obtain a human body model of the user.

Specifically, the server may perform three-dimensional reconstruction based on the multi-angle image, to obtain a three-dimensional human body model of the user. In some embodiments, when the multi-angle image includes an image of an angle of view in a plane, the server may perform two-dimensional reconstruction based on the multi-angle image, to obtain a two-dimensional human body model of the user.

For ease of understanding, the following uses a three-dimensional reconstruction process as an example for description.

Specifically; the server may obtain a depth map based on the multi-angle image, and then perform reconstruction based on the depth map to obtain a 3D mesh. The 3D mesh may be specifically a polygon network formed by triangles, and the polygon network is used to simulate a surface of a complex object, for example, used to simulate a surface of a human body. Based on this, the server may use the reconstructed 3D mesh as the human body model. Each raster of the 3D mesh has a gradient spherical illumination image that can be used to generate an albedo, a normal line, gloss, and ambient light occlusion maps. These maps are compatible with a standard rendering engine and can be used to regenerate rendered images under any set of illumination conditions.

In some possible implementations, the server may obtain multi-angle images of a user when the user performs different actions, for example, different expressions, different mouth shapes, or different body actions, and perform modeling separately based on the multi-angle images, to obtain a human body model of the user when the user performs different expressions, different mouth shapes, or different body actions.

The model constructed by using this method is very refined and realistic. In addition, the model can be modified offline, such as beauty, hairstyle change, and clothes change, to improve user satisfaction or simplify the model to reduce resource consumption. In addition, for each user, after obtaining the human body model through modeling, the server may save the human body model, for example, save the human body model to a cloud, for subsequent reuse.

The following describes the remote reproduction method provided in this application with reference to specific embodiments.

The remote reproduction method provided in this embodiment of this application may be implemented through device-cloud synergy, for example, may be implemented by using the remote reproduction system 100 shown in FIG. 1. This implementation is described below in detail with reference to the accompanying drawings.

Refer to a flowchart of a remote reproduction method shown in FIG. 4A and FIG. 4B. The method is executed by the remote reproduction system 100 shown in FIG. 1. The remote reproduction system 100 includes the first terminal 102, the second terminal 104, the central server 106, and the edge server 108. The method includes the following steps.

S402: The edge server 108 obtains an image of a key part of a first user that is collected by a sensor.

The key part is a part in which a key point is located, such as an eye, a mouth, and an eyebrow: The key point is a point that represents an action of the user. The action of the user includes a facial action and/or a body action. Correspondingly, the key point includes but is not limited to a facial key point such as a pupil, an eyebrow, or a mouth corner, or a body joint point such as a knuckle, an elbow; or a knee.

A sensor, for example, an infrared camera, may be deployed in the first terminal 102 worn by the first user or in a geographical location in which the first user is located. The infrared camera may collect the image of the key part of the first user. In this way, the edge server 108 may obtain the image of the key part of the first user by using the sensor such as the infrared camera, for example, obtain an eye image, a mouth image, or another image of the key part.

For ease of understanding, an example in which the first terminal 102 worn by the first user is a VR terminal is used for description. The VR terminal may be VR glasses, a VR helmet, or the like. An infrared camera may be deployed in the VR glasses or VR helmet to capture the eye image. An infrared camera may alternatively be deployed under the VR glasses or VR helmet to capture the mouth image.

S404: The edge server 108 obtains location information of the key point of the first user based on the image of the key part of the first user.

The edge server 108 may process the image of the key part of the first user by using a key point detection technology; to obtain the location information of the key point of the first user. Specifically, the edge server 108 may construct a key point detection model, then input the image of the key part of the first user into the key point detection model, and extract a key point from the image by using the key point detection model, to obtain the location information of the key point of the first user.

The key point detection model may be obtained based on an open-source model, for example, may be obtained by performing fine tuning on the open-source model. In some embodiments, the key point detection model may be a conventional key point detection model. The conventional key point detection model includes a key point detection model based on template matching, for example, a pictorial structure model. The key point detection model may alternatively be a neural network-based key point detection model. The neural network-based key point detection model includes but is not limited to Google's research and machine intelligence (G-RMI) model, a cascaded feature network (CFN) model, a regional multi-person pose estimation (RMPE) model, a mask region convolutional neural network (mask R-CNN) model, a cascaded pyramid network (CPN) model, and the like.

S402 to S404 are an implementation of obtaining the location information of the key point of the first user in this embodiment of this application. In another possible implementation of this embodiment of this application, the edge server 108 may alternatively obtain the location information of the key point of the first user in another manner. For example, the edge server 108 may directly obtain, from a pose sensor deployed at the key part of the first user, location information of a key point corresponding to the key part.

S406: The edge server 108 sends the location information of the key point of the first user to the central server 106.

S408: The central server 106 generates an action image of the first user based on the location information of the key point of the first user and a human body model of the first user.

The central server 106 stores the human body model of the first user. The human body model of the first user includes human body models of the first user in different actions, for example, different facial actions (different expressions and different mouth shapes) and different body actions. The human body model of the first user is bound to the key point of the first user. The key point of the first user may be a point that represents an action of the first user, for example, a key point that represents a facial action of the first user, such as an eyebrow, a pupil, or a mouth corner.

The central server 106 may determine a movement track of the key point of the first user based on the location information of the key point of the first user. Then, the central server 106 may obtain the action image of the first user based on the movement track of the key point of the first user and the human body model of the first user that is stored in the central server 106. For example, the central server 106 may perform rendering based on the movement track of the key point of the first user and the human body model of the first user, to generate the action image of the first user.

The movement track of the key point may be represented as a location sequence of the key point. The key point of the first user is bound to the human body model of the first user. The central server 106 may determine, based on the location sequence of the key point, a human body model corresponding to each location. A consecutive human body model can be formed based on the human body models corresponding to the locations, to generate the action image of the first user. The action image of the first user includes a sequence of at least one action formed by the human body model of the user.

S410: The central server 106 sends the action image of the first user to the second terminal 104.

S412: The second terminal 104 reproduces, for a second user, the action image of the first user at a geographical location in which the second user is located.

Specifically, the second terminal 104 may play the action image by using a display of the second terminal 104, to reproduce, for the second user, the action image of the first user at the geographical location in which the second user is located. In an online learning scenario, the geographical location in which the second user is located may be a residence or a school of the second user, and includes but is not limited to a residence, a dormitory, a hotel, a classroom, a library, a self-study room, and the like.

The second terminal 104 may be a planar terminal, for example, may be a large-screen terminal such as a television or a portable terminal such as a smartphone or a tablet computer. The action image may be a two-dimensional action image. The planar terminal may play the two-dimensional action image, to reproduce, for the second user, the two-dimensional image of the first user at the geographical location in which the second user is located.

In some embodiments, the second terminal 104 may alternatively be a stereoscopic terminal, for example, a virtual reality (VR) terminal or an AR terminal. The VR terminal may include devices such as VR glasses and a VR head mounted display, and the AR terminal may include AR glasses and an AR head mounted display. The action image may be a three-dimensional action image. The VR terminal and AR terminal may play the three-dimensional action image, to reproduce, for the second user, the three-dimensional image of the first user at the geographical location in which the second user is located.

Rendering efficiency of the two-dimensional action image is relatively high, and the second user can timely view the action image of the first user, thereby reducing a delay. The three-dimensional action image may vividly present an image of the first user, and provide a better immersive experience for the second user.

It should be noted that, when rendering the action image of the first user, the central server 106 may further convert the human body model of the first user to a coordinate system corresponding to the second terminal 104 for rendering. In this way, images of the first user that are observed by a plurality of second users by using the second terminals 104 may be at a same location, thereby further improving immersion.

S414: The edge server 108 obtains an image of a key part of the second user that is collected by a sensor.

S416: The edge server 108 obtains location information of the key point of the second user based on the image of the key part of the second user.

The process of the edge server 108 obtaining the image of the key part of the second user, and obtaining the location information of the key point of the second user based on the image of the key part of the second user is similar to the process by which the edge server 108 obtains the image of the key part of the first user, and obtains the location information of the key point of the first user based on the image of the key part of the first user. Details are not described herein again.

In some embodiments, the edge server 108 may alternatively directly obtain, from a pose sensor deployed at the key part of the second user, location information of a key point corresponding to the key part.

S418: The edge server 108 sends the location information of the key point of the second user to the central server 106.

S420: The central server 106 generates an action image of the second user based on the location information of the key point of the second user and a human body model of the second user.

The central server 106 may determine a movement track of the key point of the second user based on the location information of the key point of the second user, and then obtain the action image of the second user based on the movement track of the key point of the second user and the human body model of the second user that is stored in the central server 106.

For a specific implementation of generating the action image of the second user by the central server 106, refer to related content descriptions in S408 in which the central server 106 generates the action image of the first user. Details are not described herein again.

S422: The central server 106 sends the action image of the second user to the first terminal 102.

S424: The first terminal 102 presents, for the first user, the action image of the second user at the geographical location in which the first user is located.

Specifically, the first terminal 102 may play the action image of the second user by using a display of the first terminal 102, to reproduce, for the first user, the action image of the second user at the geographical location in which the first user is located. In the online learning scenario, the geographical location in which the first user is located may be a residence or a school of the first user, such as a residence, a dormitory, a hotel, a classroom, or an office.

Similar to the second terminal 104, the first terminal 102 may be a planar terminal, for example, may be a large-screen terminal such as a television or a portable terminal such as a smartphone or a tablet computer. The action image may be a two-dimensional action image. The planar terminal may play the two-dimensional action image, to reproduce, for the first user, the two-dimensional image of the second user at the geographical location in which the first user is located.

In some embodiments, the first terminal 102 may be a stereoscopic terminal, for example, a VR terminal or an AR terminal. The VR terminal may include devices such as VR glasses and a VR head mounted display, and the AR terminal may include AR glasses and an AR head mounted display. The action image may be a three-dimensional action image. The VR terminal and the AR terminal may play the three-dimensional action image, to reproduce, for the first user, the three-dimensional image of the second user at the geographical location in which the first user is located.

The embodiment shown in FIG. 4A and FIG. 4B is described by using the online learning scenario as an example. In some possible implementations, for example, in a remote assistance scenario, S414 to S424 may not be performed. For example, the central server 106 may further obtain an image of the geographical location in which the second user is located, and send the image of the geographical location in which the second user is located to the first terminal 102. The first terminal 102 reproduces, for the first user, the action image of the second user at the geographical location in which the first user is located.

Further, the central server 106 may obtain the image of the geographical location in which the second user is located and the action image of the second user, and send, to the first terminal 102, the image of the geographical location in which the second user is located and the action image of the second user. In this way, the first terminal 102 presents, to the first user, the image of the geographical location in which the second user is located and the action image of the second user at the geographical location in which the first user is located.

Based on the foregoing content description, an embodiment of this application provides a remote reproduction method. In this method, a remote reproduction process is divided into two phases: a preparation phase before remote reproduction starts and a remote reproduction phase. In the preparation phase, a human body model of a first user is pre-constructed, and in the remote reproduction phase, an action image is generated by using the human body model, so that a large amount of time is not spent in reconstructing the human body model in the remote reproduction phase, and a real-time requirement for remote reproduction application is met. In addition, in the preparation phase, reconstruction may be performed in a relatively long time to obtain a realistic human body model, which has a relatively good effect and can meet a service requirement. In addition, in the method, a key point is extracted from an image of a key part, location information of the key point is obtained, and the location information of the key point is sent to a cloud, without a need to send a large quantity of images. This not only saves network resources, but also saves computing resources, and further avoids problems that seriously affect subjective quality and that may be caused by a large-scale data transmission when the network quality is poor, such as frame loss and frame freezing. In the method, the first user and a second user are further allowed to move in a large range, and a limitation on a user movement range is small, thereby improving the user experience.

The embodiment shown in FIG. 4A and FIG. 4B is mainly described by using an example in which a cloud server such as the central server 106 generates an action image. In some possible implementations, a process of generating the action image may alternatively be implemented by a terminal (for example, the first terminal 102 and the second terminal 104). It should be noted that a prerequisite for generating an action image by the terminal is that the terminal pre-constructs a human body model corresponding to the user, or pre-obtains a human body model of the user from another device such as a server. A specific implementation of constructing the human body model by the terminal is similar to an implementation process of constructing the human body model by the server in the embodiment shown in FIG. 3, and details are not described herein again. A remote reproduction method in which an action image is generated by a terminal is described below with reference to an embodiment.

Figure 5:
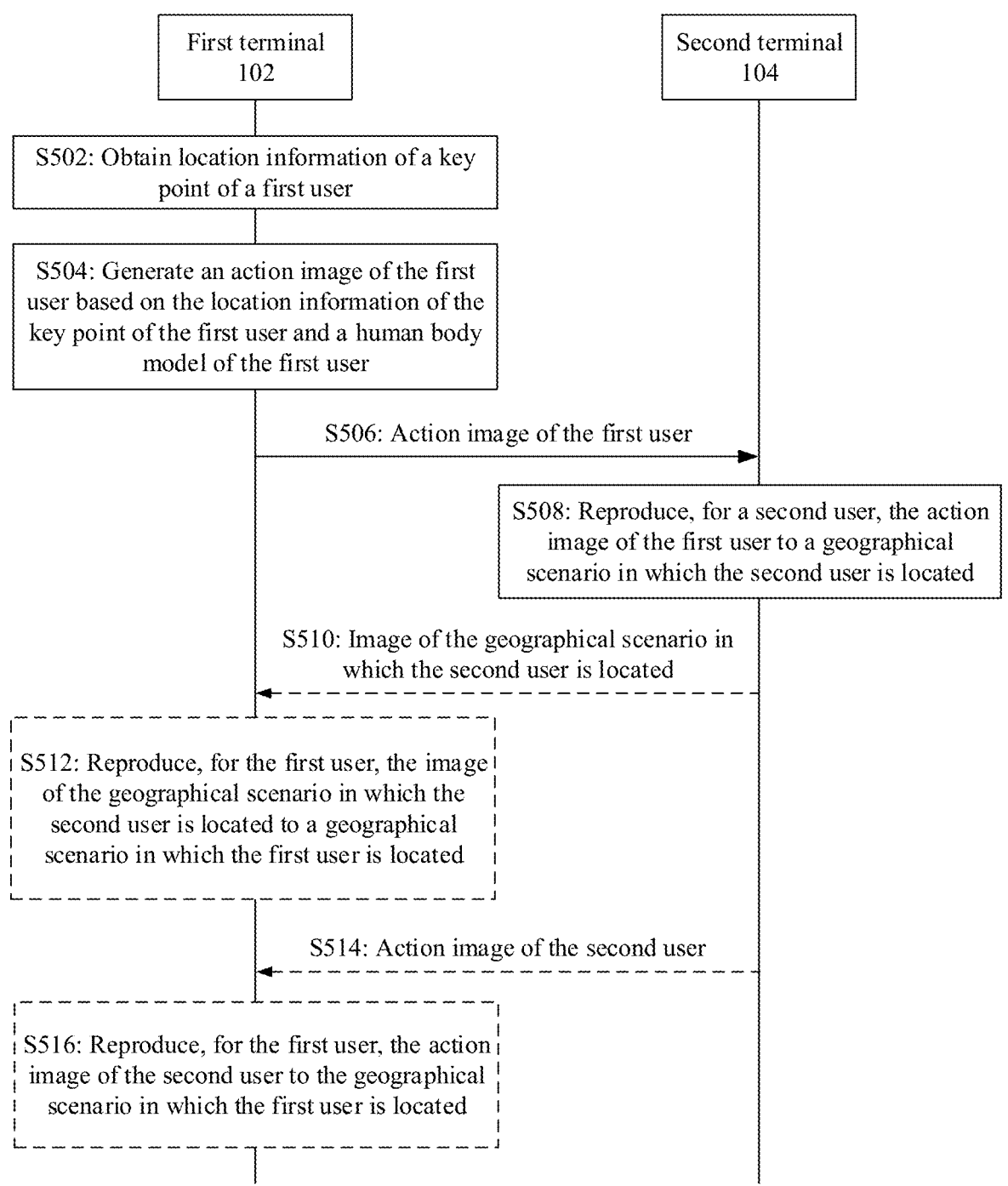
FIG. 5 is a flowchart of a remote reproduction method according to another embodiment of this application.

Refer to a flowchart of a remote reproduction method shown in FIG. 5. The method is executed by the remote reproduction system 100 shown in FIG. 2. The remote reproduction system 100 includes the first terminal 102 and the second terminal 104. The method includes the following steps.

S502: The first terminal 102 obtains location information of a key point of a first user.

The key point is a point that represents an action of the user. The action of the user includes a facial action and/or a body action. Correspondingly, the key point includes but is not limited to a facial key point such as a pupil, an eyebrow; or a mouth corner, or a body joint point such as a knuckle, an elbow; or a knee.

In some possible implementations, a sensor may be deployed in a body of the first user, the first terminal 102, or a geographical location in which the first user is located, to capture information about the first user or information about the geographical location in which the first user is located. The sensor includes at least one of a camera (such as an infrared camera or a visible light camera) and a pose sensor (such as an inertial measurement unit (IMU)). Further, the sensor may further include a capacitive sensor, configured for eyeball tracking.

The first terminal 102 may obtain an image of a key part of the first user by using the camera deployed on the body of the first user, the first terminal 102, or an environment (the geographical location in which the first user is located) in which the first user is located. The key part is a part in which the key point is located, for example, an eye, a mouth, or an eyebrow. Then, the first terminal 102 obtains location information of a corresponding key point based on the image of the key part of the first user. Specifically, the first terminal 102 may detect the image of the key part by using a key point detection model, to obtain the location information of the key point.

The first terminal 102 may alternatively directly capture the location information of the key point of the first user by using the sensor. Specifically, the first terminal 102 may obtain pose information of the key point of the first user from the pose sensor such as the IMU deployed at the key part, to obtain the location information of the key point of the first user.

S504: The first terminal 102 generates an action image of the first user based on the location information of the key point of the first user and a human body model of the first user.

The human body model is a model used to describe a human body. For the same user, when the user performs different actions, for example, different body actions or different facial actions (for example, different mouth shapes and different expressions), the human body model may be different. The first terminal 102 may obtain the human body model of the first user in different actions (for example, different mouth shapes, different expressions, and different body actions).

In some possible implementations, the first terminal 102 may further optimize the human body model of the first user. For example, the first terminal 102 may support beauty, hair change, and dress change on the human body model, so that the human body model can further meet a personalized requirement while retaining a feature of the first user, thereby improving user experience.

In consideration of a rendering speed and rendering efficiency, the first terminal 102 may further simplify the human body model. Specifically, the first terminal 102 may perform sparseness processing on the human body model, to simplify the human body model. In this way, a rendering calculation amount can be reduced, and the rendering speed and rendering efficiency can be improved.

The first terminal 102 may determine a movement track of the key point of the first user based on the location information of the key point of the first user. The key point of the first user is bound to the human body model of the first user. The first terminal 102 may drive the human body model of the first user based on the movement track of the key point of the first user, for example, perform rendering based on the movement track and the corresponding human body model, to generate the action image of the first user.

The movement track of the key point may be represented as a location sequence of the key point. The key point of the first user is bound to the human body model of the first user. The first terminal 102 may determine, based on the location sequence of the key point, a human body model corresponding to each location. A consecutive human body model can be formed based on the human body models corresponding to the locations, to generate the action image of the first user. The action image of the first user includes a sequence of at least one action formed by the human body model of the user.

S506: The first terminal 102 sends the action image of the first user to the second terminal 104.

S508: The second terminal 104 presents, for a second user, the action image of the first user at a geographical location in which the second user is located.

Specifically, the second terminal 104 may play the action image by using a display of the second terminal 104, to reproduce, for the second user, the action image of the first user at the geographical location in which the second user is located. The second terminal 104 may be a planar terminal, for example, a television, a whiteboard device, a desktop computer, a notebook computer, or a smartphone. Correspondingly, the action image of the first user may be a two-dimensional action image. The second terminal 104 may alternatively be a stereoscopic terminal, for example, a VR terminal or an AR terminal, including VR glasses, a VR helmet, AR glasses, and an AR helmet. Correspondingly, the action image of the first user may be a three-dimensional action image.

A rendering efficiency of the two-dimensional action image is relatively high, and the second user can timely view the action image of the first user, thereby reducing a delay. The three-dimensional action image may vividly reproduce an image of the first user, and provide a better immersive experience for the second user.

It should be noted that, when rendering the action image of the first user, the first terminal 102 may further convert the human body model of the first user to a coordinate system corresponding to the second terminal 104 for rendering. In this way, images of the first user that are observed by a plurality of second users by using the second terminals 104 may be at a same location, thereby further improving immersion.

Based on the foregoing content description, an embodiment of this application provides a remote reproduction method. In this method, the action image is generated by using the pre-constructed human body model of the first user, so that a large amount of time is not required for constructing a human body model during remote reproduction, and a real-time requirement of remote reproduction application is met. In addition, in the preparation phase, reconstruction may be performed in a relatively long time to obtain a realistic human body model, which has a relatively good effect and can meet a service requirement. In addition, in the remote reproduction phase, a large number of images do not need to be sent to a cloud to reconstruct a human body model in real time. In this way, a large number of network resources do not need to be occupied by large-scale data transmission while frame loss and frame freezing are avoided when the network quality is poor, thereby improving the interaction experience.

That the second terminal 104 plays the action image of the first user to reproduce the action image of the first user for the second user is mainly described in the embodiment shown in FIG. 5. In some possible implementations, the first terminal 102 may further play an image related to the second user, to present, to the first user, the image related to the second user.

The image related to the second user may be an image of the geographical location in which the second user is located. For example, in a remote assistance scenario, the first terminal 102 may further perform the following steps.

S510: The first terminal 102 receives the image of the geographical location in which the second user is located that is sent by the second terminal 104.

Specifically, the second user may be an operator at a fault site. The fault site refers to a site where a fault occurs, for example, a site where a faulty device is located in a factory or a laboratory: The image of the geographical location in which the second user is located may be an image of the fault site, for example, an image of a faulty device.

The first terminal 102 may be a VR terminal, for example, VR glasses. The second terminal may be an AR terminal, for example, AR glasses. In this way, the image of the first user may be superimposed with the image of the fault site, and then the image of the first user and the image of the fault site are projected to the AR terminal of the onsite operator. In this way, the onsite operator may observe the first user by using the AR terminal. The image of the first user may not move with the operator. From a perspective of the second user, the first user may walk around, point, speak, and the like, as if the first user is present, thereby improving the interactive experience.

S512: The first terminal 102 presents, for the first user, the image of the geographical location in which the second user is located at the geographical location in which the first user is located.

Specifically, the first user may be an expert having a fault diagnosis or fault maintenance capability: The first terminal 102 may play the image of the geographical location in which the second user is located, to reproduce, for the first user, the image of the fault site in which the second user is located at the geographical location in which the first user is located.

S510 to S512 may be performed after S508. Based on this, the image sent by the second terminal 104 of the geographical location in which the second user is located may alternatively be a fault site image in a field of view of the first user. Specifically, the second terminal 104 may obtain a pupil location of the first user. The pupil location may be obtained through eyeball tracking. Then, the second terminal 104 may determine the field of view of the first user based on the pupil location of the first user. The second terminal 104 may obtain the fault site image in the field of view of the first user in a manner such as onsite shooting, view synthesis, or environment simulation.

Onsite shooting means that a fault site is captured by a binocular camera carried by a mechanical arm, where the mechanical arm is driven by the pupil location of the first user. The second terminal 104 may obtain the fault site image in the field of view of the first user from the binocular camera.

View synthesis aims to synthesize videos taken, by deploying in advance several fixed cameras in the geographical location (for example, the fault site) in which the second user is located, by cameras having a plurality of fields of view that are close to the field of view of the first user, to obtain the fault site image in the field of view of the first user.

Environment simulation models an environment of the fault site in advance to obtain an environment model, then establishes a coordinate system based on the field of view of the first user (for example, a field of view of an expert), and renders the environment model, to obtain the fault site image in the field of view of the first user.

S510 to S512 may also be performed before S502. For example, the second terminal 104 may first send an image of the geographical location in which the second user, such as an operator, is located, for example, a fault site image. The first terminal 102 plays the fault site image, and reproduces, for the first user such as an expert, the fault site image at the geographical location in which the first user is located.

In this way, the first user may perform a corresponding action based on the fault site. For example, an eye looks to the left. The first terminal 102 may determine, based on an eye part image or an eyeball tracking result, location information of a key point including a pupil location, and generate the action image of the first user based on the location information of the key point and the human body model. The first terminal 102 sends the action image to the second terminal 104. Correspondingly, the second terminal 104 may determine the field of view of the first user based on the action image, obtain a fault site image in the field of view of the first user, and return the fault site image to the first terminal 102. After determining a fault cause based on the fault site image, the first user may further indicate a fault maintenance manner by using an action, a voice, or the like. The first terminal 102 may generate an action image indicating the fault maintenance manner, and send the action image to the second terminal 104.

In some embodiments, the image related to the second user may be the action image of the second user. For example, in an online learning scenario, the first terminal 102 may further perform the following steps:

S514: The first terminal 102 receives an action image of the second user that is sent by the second terminal 104.

In the online learning scenario, the first user may be a professional trainer or a teacher, and the second user may be a student or a trainee learning a professional skill or professional knowledge. The first user pays more attention to the second user, instead of the geographical location in which the second user is located. Based on this, the second terminal 104 may obtain the action image of the second user, and send the action image of the second user to the first terminal 102.

To obtain a more natural interaction experience, both the first terminal 102 and the second terminal 104 may be VR terminals, for example, VR glasses. Certainly, in another possible implementation of this embodiment of this application, the first terminal 102 and the second terminal 104 may be terminals of another type.

S516: The first terminal 102 presents the action image of the second user to the first user.

Specifically, the first terminal 102 plays the action image of the second user, to represent, for the first user, the action image of the second user at the geographical location in which the first user is located. The first user, for example, the trainer or the teacher, may determine, based on the action image of the second user, for example, the trainee or the student, a mastery status of the student and the trainee of the professional skill and professional knowledge, and perform targeted correction based on the status, thereby improving online learning efficiency and improving user experience of online learning.

Similar to S510 to S512, S514 and S516 may be performed after S508 or before S502. This is not limited in this embodiment of this application.

The foregoing describes in detail the remote reproduction method provided in embodiments of this application with reference to FIG. 1 to FIG. 5. The following describes, with reference to the accompanying drawings, a system, an apparatus, and a device provided in embodiments of this application.

Refer to the schematic diagram of the structure of the remote reproduction system 100 in FIG. 1 or FIG. 2. The system 100 includes the first terminal 102 and the second terminal 104, the first terminal 102 is worn by a first user, the second terminal 104 is worn by a second user, and the first user and the second user are located in different geographical locations.

The second terminal 104 is configured to: obtain an action image of the first user, and reproduce, for the second user, the action image of the first user at a geographical location in which the second user is located, where the action image of the first user includes a sequence of at least one action formed by a human body model of the first user, and the human body model of the first user is a pre-constructed model.

In some possible implementations, the remote reproduction system 100 further includes a server, for example, includes the central server 106 and the edge server 108.

The edge server 108 is configured to obtain location information of a key point of the first user.

The central server 106 is configured to: determine a movement track of the key point of the first user based on the location information of the key point of the first user, and obtain the action image of the first user based on the movement track and the human body model of the first user that is stored in the server.

In a possible implementation, the server (for example, the edge server 108) is specifically configured to:

obtain an image of a key part of the first user, and obtain location information of a corresponding key point based on the image of the key part of the first user.

In a possible implementation, the server (for example, the edge server 108) is specifically configured to:

obtain, from a pose sensor deployed at a key part of the first user, location information of a key point corresponding to the key part.

In a possible implementation, the first terminal 102 is configured to:

obtain an image of the geographical location in which the second user is located; and reproduce, for the first user, the image of the geographical location in which the second user is located at a geographical location in which the first user is located.

In some possible implementations, the first terminal is a virtual reality terminal, and the second terminal is an augmented reality terminal.

In a possible implementation, the first terminal 102 is configured to:

obtain an action image of the second user, where the action image of the second user includes a sequence of at least one action formed by a human body model of the second user, and the human body model of the second user is a pre-constructed model; and reproduce, for the first user, the action image of the second user at a geographical location in which the first user is located.

In some possible implementations, the first terminal and the second terminal are virtual reality terminals.

In a possible implementation, the first terminal 102 is configured to:

obtain location information of a key point of the first user;

determine a movement track of the key point of the first user based on the location information of the key point of the first user; and obtain the action image of the first user based on the movement track and the human body model of the first user that is stored in the first terminal 102.

In some possible implementations, the human body model is a three-dimensional human body model, and the action image is a three-dimensional action image.

The remote reproduction system 100 according to this embodiment of this application may correspondingly perform the method described in embodiments of this application, and the foregoing and other operations and/or functions of each component of the remote reproduction system 100 are separately used to implement corresponding procedures of the methods in embodiments shown in FIG. 4A and FIG. 4B and FIG. 5. For brevity, details are not described herein again.

Based on the remote reproduction method provided in embodiments of this application, an embodiment of this application provides a corresponding remote reproduction apparatus. The remote reproduction apparatus may be a software apparatus. The remote reproduction apparatus is deployed in the second terminal 104. The second terminal 104 is worn by a second user, and the second user and the first user are located in different geographical locations.

Figure 6:
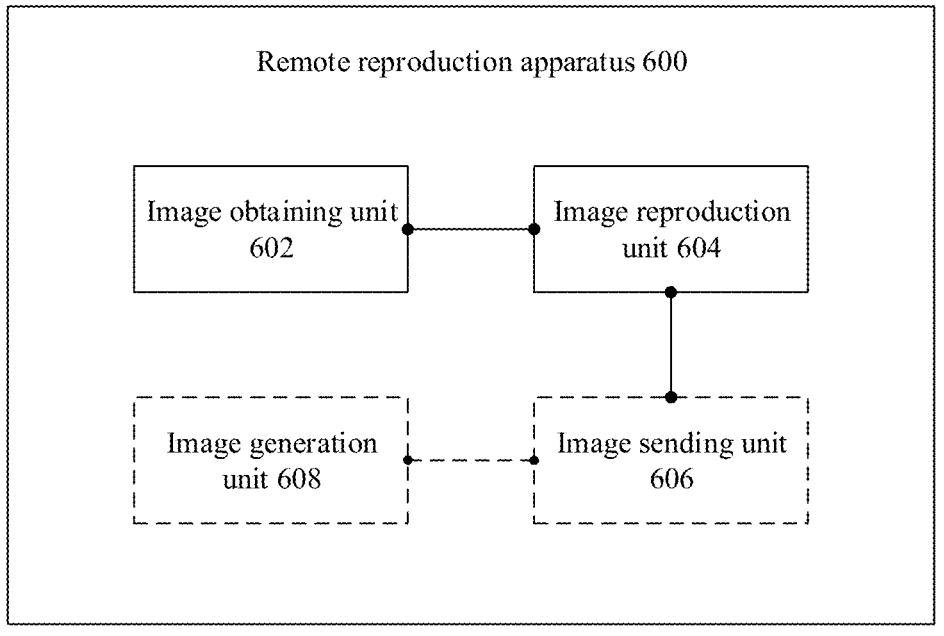
FIG. 6 is a schematic diagram of a structure of a remote reproduction apparatus according to an embodiment of this application.

Refer to a schematic diagram of a structure of a remote reproduction apparatus shown in FIG. 6. The apparatus 600 includes:

an image obtaining unit 602, configured to obtain an action image of the first user, where the action image of the first user includes a sequence of at least one action formed by a human body model of the first user, and the human body model of the first user is a pre-constructed model; and an image reproduction unit 604, configured to reproduce, for the second user, the action image of the first user at a geographical location in which the second user is located.

In some possible implementations, the apparatus 600 further includes:

an image sending unit 606, configured to send an action image of the second user to the first terminal, where the action image of the second user includes a sequence of at least one action formed by a human body model of the second user, and the human body model of the second user is a pre-constructed model.

In some possible implementations, the apparatus 600 further includes:

an image generation unit 608, configured to: obtain location information of a key point of the second user, determine a movement track of the key point of the second user based on the location information of the key point of the second user, and obtain the action image of the second user based on the movement track and the human body model of the second user that is stored in the second terminal 104.

In some possible implementations, the image generation unit 608 is specifically configured to:

obtain an image of a key part of the second user, and obtain location information of a corresponding key point based on the image of the key part of the second user.

In some possible implementations, the image generation unit 608 is specifically configured to:

obtain, from a pose sensor deployed at a key part of the second user, location information of a key point corresponding to the key part.

In some possible implementations, the apparatus 600 further includes:

an image sending unit 606, configured to send, to the first terminal, an image of the geographical location in which the second user is located.

In some possible implementations, the image obtaining unit 602 is specifically configured to:

obtain the action image of the first user from a server or the first terminal.

In some possible implementations, the human body model is a three-dimensional human body model, and the action image is a three-dimensional action image.

The remote reproduction apparatus 600 according to this embodiment of this application may correspondingly perform the method described in embodiments of this application, and the foregoing and other operations and/or functions of the modules/units of the remote reproduction apparatus 600 are separately used to implement corresponding procedures of the methods in embodiments shown in FIG. 4A and FIG. 4B and FIG. 5. For brevity, details are not described herein again.

Based on the remote reproduction method provided in embodiments of this application, an embodiment of this application provides another remote reproduction apparatus. The remote reproduction apparatus may be a software apparatus, and the remote reproduction apparatus is deployed in a server.

Figure 7:
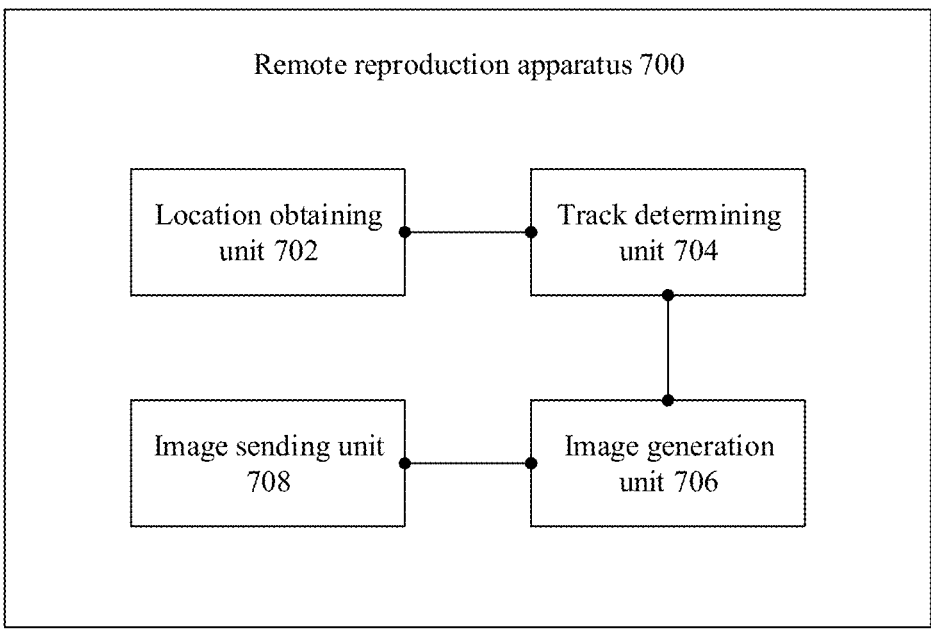
FIG. 7 is a schematic diagram of a structure of a remote reproduction apparatus according to another embodiment of this application.

Refer to a schematic diagram of a structure of a remote reproduction apparatus shown in FIG. 7. The apparatus 700 includes:

a location obtaining unit 702, configured to obtain location information of a key point of a first user;

a track determining unit 704, configured to determine a movement track of the key point of the first user based on the location information of the key point of the first user;

an image generation unit 706, configured to obtain an action image of the first user based on the movement track and a human body model of the first user that is stored in the server (for example, the central server 106), where the action image of the first user includes a sequence of at least one action formed by the human body model of the first user, and the human body model of the first user is a pre-constructed model; and an image sending unit 708, configured to send the action image of the first user to a second terminal, so that the second terminal reproduces, for a second user, the action image of the first user at a geographical location in which the second user is located, where the first user and the second user are located in different geographical locations.

In some possible implementations, the location obtaining unit 702 is specifically configured to:

obtain an image of a key part of the first user, and obtain location information of a corresponding key point based on the image of the key part of the first user.

In some possible implementations, the location obtaining unit 702 is specifically configured to:

obtain, from a pose sensor deployed at a key part of the first user, location information of a key point corresponding to the key part.

In some possible implementations, the location obtaining unit 702 is further configured to:

obtain location information of a key point of the second user.

The track determining unit 704 is further configured to:

determine a movement track of the key point of the second user based on the location information of the key point of the second user.

The image generation unit 706 is further configured to:

obtain an action image of the second user based on the movement track and a human body model of the second user that is stored in the server, where the action image of the second user includes a sequence of at least one action formed by the human body model of the second user, and the human body model of the second user is a pre-constructed model.

The image sending unit 708 is further configured to:

send the action image of the second user to the first terminal, so that the first terminal reproduces, for the first user, the action image of the second user at a geographical location in which the first user is located.

In some possible implementations, the image generation unit 706 is further configured to:

generate an image of the geographical location in which the second user is located.

The image sending unit 708 is further configured to:

send the image of the geographical location in which the second user is located to the first terminal.

The remote reproduction apparatus 700 according to this embodiment of this application may correspondingly perform the method described in embodiments of this application, and the foregoing and other operations and/or functions of the modules/units of the remote reproduction apparatus 700 are separately used to implement corresponding procedures of the methods in embodiments shown in FIG. 4A and FIG. 4B and FIG. 5. For brevity, details are not described herein again.

Based on the remote reproduction method provided in embodiments of this application, an embodiment of this application provides still another remote reproduction apparatus. The remote reproduction apparatus may be a software apparatus, and the remote reproduction apparatus is deployed in the first terminal 102. The first terminal 102 is worn by a first user, and the first user and a second user are located in different geographical locations.

Figure 8:
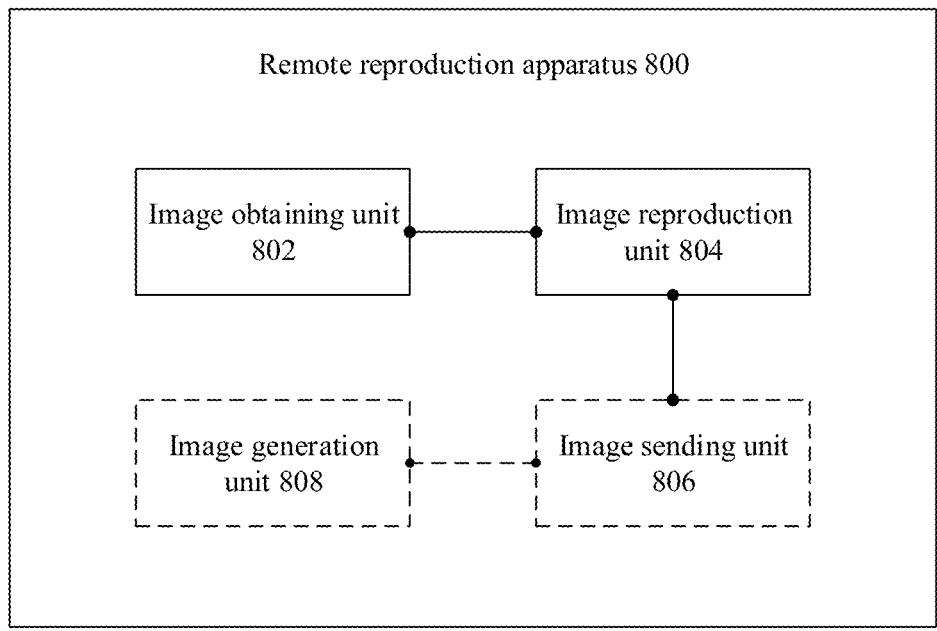
FIG. 8 is a schematic diagram of a structure of a remote reproduction apparatus according to another embodiment of this application.

Refer to a schematic diagram of a structure of a remote reproduction apparatus shown in FIG. 8. The apparatus 800 includes:

an image obtaining unit 802, configured to obtain an image of a geographical location in which the second user is located and/or an action image of the second user, where the action image of the second user includes a sequence of at least one action formed by a human body model of the second user, and the human body model of the second user is a pre-constructed model; and an image reproduction unit 804, configured to reproduce, for the first user, the image of the geographical location in which the second user is located and/or the action image of the second user at a geographical location in which the first user is located.

In some possible implementations, the apparatus 800 further includes:

an image sending unit 806, configured to send an action image of the first user to the second terminal, where the action image of the first user includes a sequence of at least one action formed by a human body model of the first user, and the human body model of the first user is a pre-constructed model.

In some possible implementations, the apparatus 800 further includes:

an image generation unit 808, configured to: obtain location information of a key point of the first user, determine a movement track of the key point of the first user based on the location information of the key point of the first user, and obtain the action image of the first user based on the movement track and the human body model of the first user that is stored in the first terminal.

In some possible implementations, the image generation unit 808 is specifically configured to:

obtain an image of a key part of the first user, and obtain location information of a corresponding key point based on the image of the key part of the first user.

In some possible implementations, the image generation unit 808 is specifically configured to:

obtain, from a pose sensor deployed at a key part of the first user, location information of a key point corresponding to the key part.

In some possible implementations, the apparatus 800 further includes:

an image sending unit 806, configured to send, to the second terminal, an image of the geographical location in which the first user is located.

In some possible implementations, the image obtaining unit 802 is specifically configured to:

obtain the action image of the second user from a server or the second terminal 104.

In some possible implementations, the human body model is a three-dimensional human body model, and the action image is a three-dimensional action image.

The remote reproduction apparatus 800 according to this embodiment of this application may correspondingly perform the method described in embodiments of this application, and the foregoing and other operations and/or functions of the modules/units of the remote reproduction apparatus 800 are separately used to implement corresponding procedures of the methods in embodiments shown in FIG. 4A and FIG. 4B and FIG. 5. For brevity, details are not described herein again.

An embodiment of this application further provides a second terminal 104. The second terminal 104 is specifically configured to implement a function of the remote reproduction apparatus 600 in the embodiment shown in FIG. 6.

Figure 9:
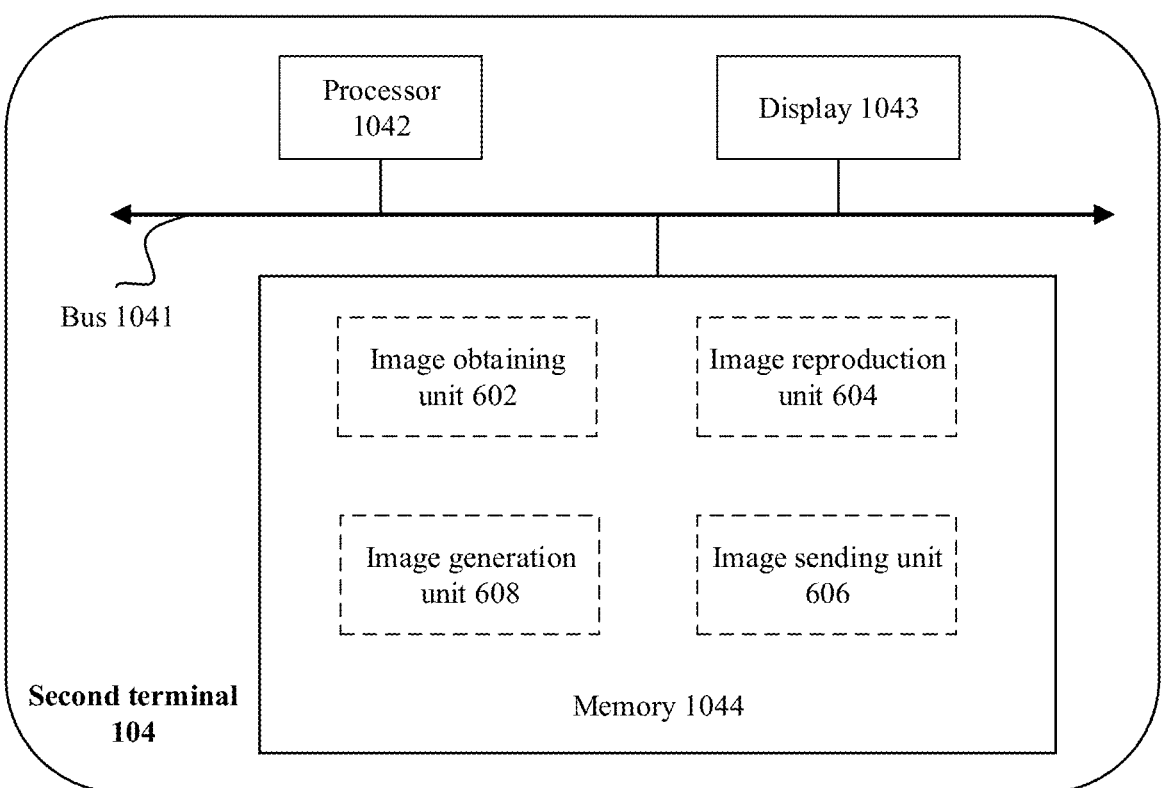
FIG. 9 is a schematic diagram of a structure of a second terminal according to an embodiment of this application.

FIG. 9 is a schematic diagram of a structure of the second terminal 104. As shown in FIG. 9, the second terminal 104 includes a bus 1041, a processor 1042, a display 1043, and a memory 1044. The processor 1042, the memory 1044, and the display 1043 communicate with each other through the bus 1041.

The bus 1041 may be a peripheral component interconnect (PCI) bus, an extended industry standard architecture (EISA) bus, or the like. Buses may be classified into an address bus, a data bus, a control bus, and the like. For ease of representation, only one thick line is used to represent the bus in FIG. 9, but this does not mean that there is only one bus or only one type of bus.

The processor 1042 may be any one or more of processors such as a central processing unit (CPU), a graphics processing unit (GPU), a microprocessor (MP), or a digital signal processor (DSP).

The display 1043 is an input/output (I/O) device. Based on different manufacturing materials, the display 1043 may be classified into a liquid crystal display LCD), an organic light-emitting diode (OLED) display, and the like. Specifically, the display 1043 may reproduce an action image of a first user to a second user at a geographical location in which the second user is located.

The memory 1044 may include a volatile memory, for example, a random access memory (RAM). The memory 1044 may further include a non-volatile memory, for example, a read-only memory (ROM), a flash memory, a hard disk drive (HDD), or a solid state drive (SSD).

The memory 1044 stores executable code, and the processor 1042 executes the executable code to perform the foregoing remote reproduction method. Specifically, when the embodiment shown in FIG. 6 is implemented, and the modules or units of the remote reproduction apparatus 600 described in the embodiment of FIG. 6 are implemented by using software, some or all of software or program code required for performing functions of the image obtaining unit 602, the image reproduction unit 604, the image sending unit 606, and the image generation unit 608 in FIG. 6 may be stored in the memory 1044. The processor 1042 executes program code corresponding to each unit stored in the memory 1044 to execute the remote reproduction method.

Embodiments of this application further provide a server. The server is specifically configured to implement a function of the remote reproduction apparatus 700 in the embodiment shown in FIG. 7. The server may be the central server 106 or the edge server 108. In this embodiment of this application, the central server 106 is used as an example for description.

Figure 10:
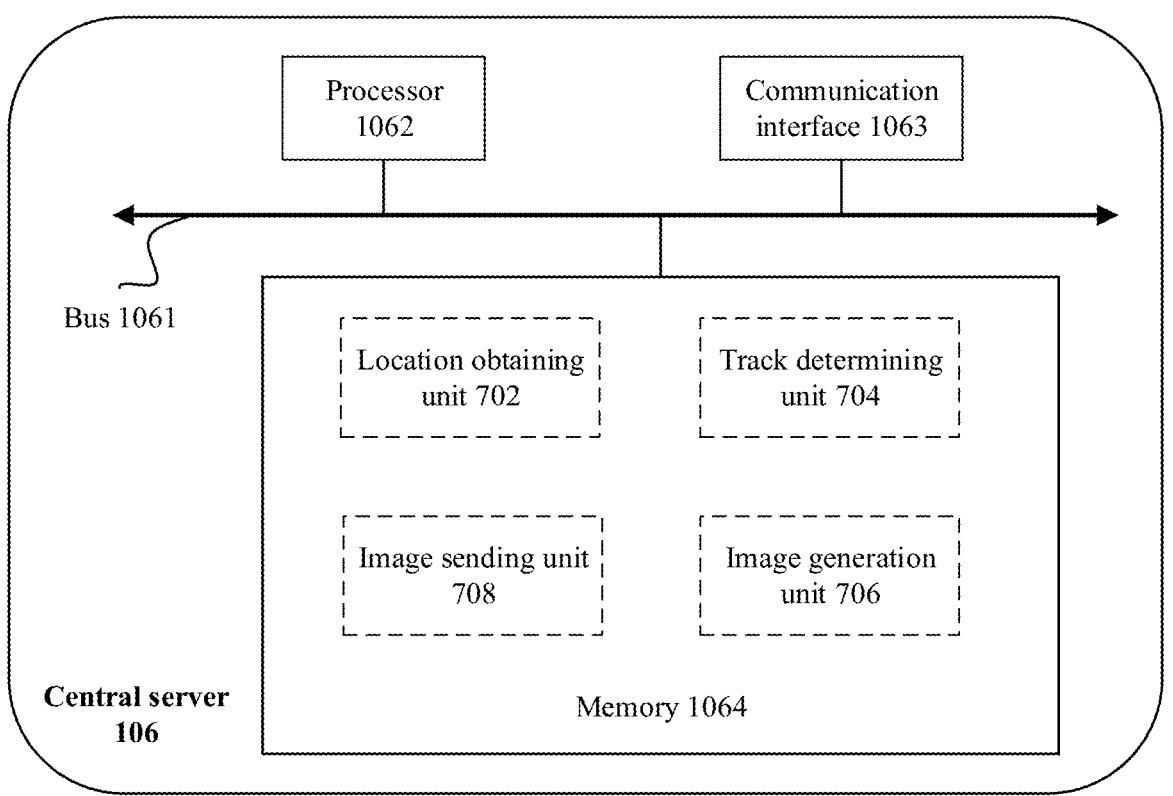
FIG. 10 is a schematic diagram of a structure of a server according to an embodiment of this application.

FIG. 10 is a schematic diagram of a structure of the central server 106. As shown in FIG. 10, the central server 106 includes a bus 1061, a processor 1062, a communication interface 1063, and a memory 1064. The processor 1062, the memory 1064, and the communication interface 1063 communicate with each other through the bus 1061.

For specific implementations of the bus 1061, the processor 1062, and the memory 1064, refer to related content descriptions in the embodiment shown in FIG. 9. The communication interface 1063 is mainly configured to communicate with the outside, for example, configured to: obtain location information of a key point of a first user from a pose sensor or the edge server 108, and send an action image of the first user to the second terminal 104; for another example, obtain location information of a key point of a second user from the pose sensor or the edge server 108, and send the action image of the first user to the first terminal 102.

Specifically, when the embodiment shown in FIG. 7 is implemented, and the modules or units of the remote reproduction apparatus 700 described in the embodiment of FIG. 7 are implemented by using software, some or all of software or program code required for performing functions of the location obtaining unit 702, the track determining unit 704, the image generation unit 706, and the image sending unit 708 in FIG. 7 may be stored in the memory 1064. The processor 1062 executes program code corresponding to each unit stored in the memory 1064 to execute the remote reproduction method.

An embodiment of this application further provides a first terminal 102. The first terminal 102 is specifically configured to implement a function of the remote reproduction apparatus 800 in the embodiment shown in FIG. 8.

Figure 11:
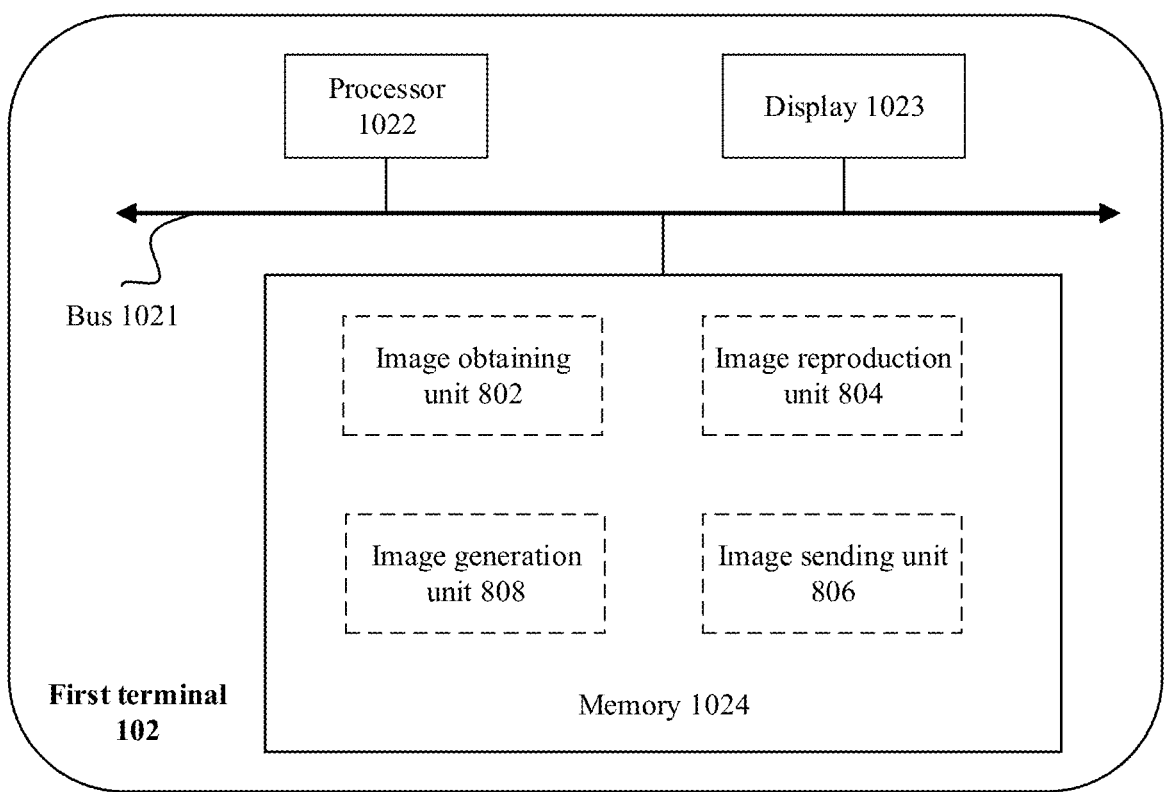
FIG. 11 is a schematic diagram of a structure of a first terminal according to an embodiment of this application.

FIG. 11 is a schematic diagram of a structure of the first terminal 102. As shown in FIG. 11, the first terminal 102 includes a bus 1021, a processor 1022, a display 1023, and a memory 1024. The processor 1022, the memory 1024, and the display 1023 communicate with each other through the bus 1021.

For specific implementations of the bus 1021, the processor 1022, the display 1023, and the memory 1024, refer to related content descriptions in the embodiment shown in FIG. 9. Specifically, when the embodiment shown in FIG. 8 is implemented, and the modules or units of the remote reproduction apparatus 800 described in the embodiment of FIG. 8 are implemented by using software, some or all of software or program code required for performing functions of the image obtaining unit 802, the image reproduction unit 804, the image sending unit 806, and the image generation unit 808 in FIG. 8 may be stored in the memory 1024. The processor 1022 executes program code corresponding to each unit stored in the memory 1024 to execute the remote reproduction method.

Embodiments of this application further provide a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a DVD), a semiconductor medium (for example, a solid-state drive), or the like. The computer-readable storage medium includes instructions, and the instructions instruct a computing device to perform the foregoing remote reproduction method applied to the remote reproduction apparatus 600, the remote reproduction apparatus 700, or the remote reproduction apparatus 800.

An embodiment of this application further provides a computer program product. The computer program product includes one or more computer instructions. When the computer instructions are loaded and executed on a computing device, all or some of the procedures or functions according to embodiments of this application are generated.

The computer instructions may be stored in a computer-readable storage medium or may be transmitted from a computer-readable storage medium to another computer-readable storage medium. For example, the computer instructions may be transmitted from a website, computer, or data center to another website, computer, or data center in a wired (for example, a coaxial cable, an optical fiber, or a digital subscriber line (DSL)) or wireless (for example, infrared, radio, or microwave) manner.

When the computer program product is executed by a computer, the computer performs any one of the foregoing remote reproduction methods. The computer program product may be a software installation package. If any one of the foregoing remote reproduction methods needs to be used, the computer program product may be downloaded, and the computer program product may be executed on a computer.

Descriptions of procedures or structures corresponding to the foregoing accompanying drawings have respective focuses. For a part that is not described in detail in a procedure or structure, refer to related descriptions of other procedures or structures.

What is claimed is:

1. A remote reproduction method applied to a remote reproduction system comprising a server, a first terminal worn by a first user, and a second terminal worn by a second user, the first and second users being located in different geographical locations, the method comprising:
obtaining a multi-angle image of the first user;
performing a reconstruction based on the multi-angle image to obtain a human body model of the user;
obtaining, by the second terminal, an action image of the first user, wherein the action image of the first user comprises a sequence of at least two actions formed by the human body model of the first user; and
reproducing, for the second user by the second terminal, the action image of the first user.

2. The method according to claim 1, wherein the method further comprises:
obtaining, by the server, location information of a key point of the first user; determining, by the server, a movement track of the key point based on the location information of the key point; obtaining, by the server, the action image based on the movement track and the human body model of the first user that is stored in the server; and sending, by the server, the action image to the second terminal.

3. The method according to claim 2, wherein obtaining the location information of the key point comprises:
obtaining, by the server, an image of a key part of the first user, and obtaining location information of the key point based on the image of the key part.

4. The method according to claim 2, wherein obtaining the location information of the key point of the first user comprises:
obtaining, by the server from a pose sensor deployed at a key part of the first user, the location information of the key point corresponding to the key part.

5. The method according to claim 1, further comprising:
obtaining, by the first terminal, an image of the geographical location in which the second user is located; and reproducing, by the first terminal, the image of the geographical location in which the second user is located.

6. The method according to claim 1, wherein the first terminal is a virtual reality terminal, and the second terminal is an augmented reality terminal.

7. The method according to claim 1, further comprising:
obtaining, by the first terminal, an action image of the second user, wherein the action image of the second user comprises a sequence of at least two actions formed by a human body model of the second user, and the human body model of the second user is a pre-constructed model; and
reproducing, for the first user by the first terminal, the action image of the second user.

8. The method according to claim 1, wherein the first terminal and the second terminal are virtual reality terminals.

9. The method according to claim 1, further comprising:
obtaining, by the first terminal, location information of a key point of the first user;
determining, by the first terminal, a movement track of the key point based on the location information of the key point; and
obtaining, by the first terminal, the action image based on the movement track and the human body model that is stored in the first terminal.

10. The method according to claim 1, wherein the human body model is a three-dimensional human body model, and the action image is a three-dimensional action image.

11. A remote reproduction system comprising:
a first terminal worn by a first user, and a second terminal worn by a second user, the first and second users being located in different geographical locations; and
a server configured to obtain a multi-angle image of the first user, and perform a reconstruction based on the multi-angle image to obtain a human body model of the user; wherein
the second terminal is configured to obtain an action image of the first user, and reproduce, for the second user, the action image of the first user, wherein the action image of the first user comprises a sequence of at least two actions formed by the human body model of the first user.

12. The system according to claim 11, wherein the server is further configured to obtain location information of a key point of the first user, determine a movement track of the key point based on the location information of the key point, obtain the action image based on the movement track and the human body model of the first user that is stored in the server, and send the action image to the second terminal.

13. The system according to claim 12, wherein the server is additionally configured to:

obtain an image of a key part of the first user, and obtain location information of the key point based on the image of the key part.

14. The system according to claim 12, wherein the server is additionally configured to:

obtain, from a pose sensor deployed at a key part of the first user, the location information of the key point corresponding to the key part.

15. The system according to claim 11, wherein the first terminal is further configured to:

obtain an image of the geographical location in which the second user is located; and reproduce, for the first user, the image of the geographical location in which the second user is located.

16. The system according to claim 11, wherein the first terminal is a virtual reality terminal, and the second terminal is an augmented reality terminal.

17. The system according to claim 11, wherein the first terminal is further configured to:

obtain an action image of the second user, wherein the action image of the second user comprises a sequence of at least two actions formed by a human body model of the second user, and the human body model of the second user is a pre-constructed model; and reproduce, for the first user, the action image of the second user.

18. The system according to claim 11, wherein the first terminal and the second terminal are virtual reality terminals.

19. The system according to claim 11, wherein the first terminal is further configured to:

obtain location information of a key point of the first user;

determine a movement track of the key point based on the location information of the key point; and obtain the action image based on the movement track and the human body model of the first user that is stored in the first terminal.

20. The system according to claim 11, wherein the human body model is a three-dimensional human body model, and the action image is a three-dimensional action image.

21. A server comprising:

a processor and a memory, the processor being configured to execute instructions stored in the memory to:

obtain a multi-angle image of the first user;

perform a reconstruction based on the multi-angle image to obtain a human body model of the user;

obtain location information of a key point of the first user;

a movement track of the key point of the first user based on the location information of the key point of the first user;

obtaining an action image of the first user based on the movement track and a human body model of the first user, wherein the action image of the first user comprises a sequence of at least two actions formed by the human body model, and the human body model is a pre-constructed model; and sending the action image to a second terminal, so that the second terminal reproduces, for a second user, the action image at a geographical location in which the second user is located, wherein the first user and the second user are located in different geographical locations.

* * * * *